US012709883B2

(12) United States Patent
Gallob

(10) Patent No.: US 12,709,883 B2
(45) **Date of Patent: *Aug. 18, 2026**

(54) HAND WASHING STATION

(71) Applicant: Stone And Steel Systems, LLC, Mesa, AZ (US)

(72) Inventor: Randall Gallob, Scottsdale, AZ (US)

(73) Assignee: Stone And Steel Systems, LLC, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/808,816

(22) Filed: Aug. 19, 2024

(65) Prior Publication Data

US 2024/0410147 A1 Dec. 12, 2024

Related U.S. Application Data

(63) Continuation of application No. 17/359,075, filed on Jun. 25, 2021, now Pat. No. 12,065,814, which is a (Continued)

(51) Int. Cl.

*E03C 1/05* (2006.01)
*E03C 1/044* (2006.01)

(Continued)

(52) U.S. Cl.

CPC ................ *E03C 1/05* (2013.01); *E03C 1/044* (2013.01); *E03C 1/048* (2013.01); *E03C 1/057* (2013.01);

(Continued)

(58) Field of Classification Search

CPC . E03C 1/05; E03C 1/044; E03C 1/048; E03C 1/057; G05D 23/13; G05D 23/1931

See application file for complete search history.

(56) References Cited

U.S. PATENT DOCUMENTS 3,358,747 A 12/1967 Lesher et al.
4,144,596 A 3/1979 MacFarlane et al.

(Continued)

FOREIGN PATENT DOCUMENTS

CN 101858648 A 10/2010
DE 3347870 A1 9/1985

(Continued)

OTHER PUBLICATIONS

International Search Report and Written Opinion for PCT/US2017/033154, mailing date Sep. 27, 2017.

(Continued)

*Primary Examiner* — Mirza F Alam

(74) *Attorney, Agent, or Firm* — Banner & Witcoff, Ltd.

(57) ABSTRACT

A water dispenser assembly for a hand washing station includes a water heater having a water tank and a heating element configured to heat water contained in the water tank, the water tank having an inlet conduit connected to a water source and an outlet conduit, a water outlet connected to the outlet conduit and configured to receive water from the water heater through the outlet conduit, and a valve in fluid communication with the water heater and configured to selectively permit the water to be forced from the water tank and through the water outlet to dispense the water. The hand washing station may include a computer device configured for controlling components of the station.

20 Claims, 23 Drawing Sheets

Related U.S. Application Data continuation of application No. 16/302,961, filed as application No. PCT/US2017/033154 on May 17, 2017, now Pat. No. 11,047,119.

(60) Provisional application No. 62/337,686, filed on May 17, 2016.

(51) Int. Cl.
*E03C 1/048* (2006.01)
*G05D 23/13* (2006.01)

(52) U.S. Cl.
CPC .......... *G05D 23/13* (2013.01); *A47K 2210/00* (2013.01)

(56) References Cited

U.S. PATENT DOCUMENTS

| | | | |
|---|---|---|---|
| 4,936,289 | A | 6/1990 | Peterson |
| 5,671,113 | A | 9/1997 | Knepler |
| 5,868,311 | A | 2/1999 | Cretu-Petra |
| 5,954,069 | A | 9/1999 | Foster |
| 6,289,530 | B1 | 9/2001 | Miller et al. |
| 6,431,189 | B1 | 8/2002 | Deibert |
| 6,892,952 | B2 | 5/2005 | Chang et al. |
| D582,528 | S | 12/2008 | Gallob |
| 8,516,628 | B2 | 8/2013 | Conroy |
| 9,619,989 | B1 | 4/2017 | Ewing et al. |
| D797,264 | S | 9/2017 | Gallob |
| 10,041,236 | B2 | 8/2018 | Loberger et al. |
| 10,430,737 | B2 | 10/2019 | Yenni et al. |
| 11,047,119 | B2 | 6/2021 | Gallob |
| 11,542,692 | B2 | 1/2023 | Loberger et al. |
| 11,892,811 | B2 * | 2/2024 | Rexach ............ G01N 35/00871 |
| 11,949,533 | B2 * | 4/2024 | Rexach .................. G10L 21/06 |
| 12,065,814 | B2 | 8/2024 | Gallob |
| D1,049,327 | S | 10/2024 | Ren |
| 2008/0189850 | A1 | 8/2008 | Seggio et al. |
| 2011/0133105 | A1 | 6/2011 | Simon |
| 2011/0139820 | A1 | 6/2011 | Kessler et al. |
| 2011/0254682 | A1 | 10/2011 | Sigrist Christensen |
| 2011/0271441 | A1 * | 11/2011 | Bayley ..................... A47K 1/04 4/638 |
| 2012/0255116 | A1 | 10/2012 | Houghton |
| 2013/0091631 | A1 | 4/2013 | Hayes et al. |
| 2013/0186196 | A1 | 7/2013 | Veros et al. |
| 2014/0070950 | A1 | 3/2014 | Snodgrass |
| 2015/0013064 | A1 | 1/2015 | Marty et al. |
| 2015/0216369 | A1 | 8/2015 | Hamilton et al. |
| 2015/0345819 | A1 | 12/2015 | Ostrovsky et al. |
| 2015/0374580 | A1 | 12/2015 | Stine et al. |
| 2016/0177550 | A1 | 6/2016 | Sawaski |
| 2016/0273197 | A1 | 9/2016 | Gregory et al. |
| 2016/0320074 | A1 | 11/2016 | Alsadah |
| 2016/0326732 | A1 | 11/2016 | McCormick |
| 2017/0104485 | A1 | 4/2017 | Pandini |
| 2017/0254055 | A1 * | 9/2017 | Xia ......................... E03B 1/042 |
| 2017/0268208 | A1 | 9/2017 | LaMarche |
| 2017/0356173 | A1 | 12/2017 | Loberger et al. |
| 2020/0046172 | A1 | 2/2020 | Loberger et al. |
| 2022/0307246 | A1 * | 9/2022 | Gibson ................... E03C 1/057 |
| 2024/0344310 | A1 | 10/2024 | Gallob et al. |
| 2024/0368869 | A1 | 11/2024 | Smith et al. |

FOREIGN PATENT DOCUMENTS

| | | | |
|---|---|---|---|
| EP | 0637651 | A1 | 2/1995 |
| WO | 2009039290 | A2 | 3/2009 |
| WO | 2017201192 | A1 | 11/2017 |

OTHER PUBLICATIONS

Oct. 4, 2019—(CA) Office Action—App 3,024,845.
Dec. 3, 2020—(CA) Office Action—App 3,024,845.
Oct. 27, 2022—(MX) Office Action—App MX/a/2018/014248.

* cited by examiner

Tank Volume
Water Conductivity
Heater Capability
311
310
Determine Water Heating Rate 320
Determine Desired Delay Time
300
Calculate Set Temperature
330
350
340
Heat Water To/Above Set Temperature
Yes
Is Temperature At or Below Set Temperature?
Rapidly Heat Water to Desired Temperature and Dispense
No
370
Yes
Activation Indication Received?
360
No

HAND WASHING STATION

CROSS-REFERENCE TO RELATED APPLICATIONS

The present application is a continuation of U.S. patent application Ser. No. 17/359,075, filed Jun. 25, 2021, which is a continuation of U.S. patent application Ser. No. 16/302,961, filed Nov. 19, 2018, issued as U.S. Pat. No. 11,047,119 on Jun. 29, 2021, which is a U.S. National Phase filing of International Application No. PCT/US2017/033154, filed on May 17, 2017, which claims priority to U.S. Provisional Application No. 62/337,686 filed May 17, 2016, and the present application claims priority to and the benefit of all the above-identified applications, which are incorporated by reference herein in their entireties.

TECHNICAL FIELD

The present disclosure generally relates to hand washing stations. Aspects of a hand washing station disclosed herein include a water dispenser with a valve structure that provides instant delivery of water at a desired temperature through the use of a non-pressurized water heater proximate to the water dispenser, which may be provided as part of an integrated hand washing station that further includes an integral soap dispenser and/or an integral hand dryer.

BACKGROUND

Equipment for hand washing in modern restrooms typically includes discrete devices such as a water faucet or fitting, a soap dispenser, and a hand drying means, such as an air dryer or paper/cloth towel, which may be mechanically and/or electrically activate. Such equipment is effective for hand washing purposes, but nevertheless suffers from many different drawbacks and limitations. One such limitation is the inability of existing sinks and faucets for hand washing to consistently deliver water at a comfortable temperature instantaneously. Another such limitation is that existing water outlets do not conserve water and energy well, by using significantly more water than is necessary for hand washing and by dispensing unused water while the water reaches a comfortable temperature. A further such limitation is that soap dispensers often drip onto sinks and counters, requiring frequent cleaning. Yet another such limitation is that hand washing equipment can often provide difficulties in space utilization in restrooms, which are often space-limited. Spaces constructed for hand washing fixtures, and sinks in particular, are often constructed to very tight tolerances to accommodate the fixture. This complicates the installation process for such fixtures.

The present disclosure seeks to overcome certain of these limitations and other drawbacks of existing hand washing stations and associated installation methods, and to provide new features not heretofore available.

BRIEF SUMMARY

The following presents a general summary of aspects of the disclosure in order to provide a basic understanding of the disclosure. This summary is not an extensive overview of the invention. It is not intended to identify key or critical elements of the disclosure or to delineate the scope of the invention. The following summary merely presents some concepts of the disclosure in a general form as a prelude to the more detailed description provided below.

Aspects of the disclosure relate to a water dispenser assembly for a hand washing station, including a water heater having a water tank and a heating element configured to heat water contained in the water tank, the water tank having an inlet conduit connected to a water source and an outlet conduit, a water outlet connected to the outlet conduit and configured to receive water from the water heater through the outlet conduit, and a valve in fluid communication with the water heater and configured to selectively permit the water to be forced from the water tank and through the water outlet to dispense the water.

According to various aspects, the water dispenser assembly is configured to be connected to only a cold water line, the inlet conduit is configured for direct connection to a water stop, the valve is the only valve located between the water source and the water outlet, such that the valve is configured to exclusively control dispensing of the water through the water outlet, wherein the water outlet is configured to only receive water directly from the water heater, and/or the outlet conduit has a length that is no greater than 150% of a length of the inlet conduit.

According to additional aspects, the assembly further includes a computer device connected to the water heater and/or other components of the assembly, where the computer device is programmed with computer-executable instructions that, when executed, cause a processor of the computer device to perform various actions with respect to the assembly.

According to one aspect, the computer device is configured for monitoring a temperature of the water tank and transmitting instructions configured to cause the heating element to heat the water tank when the temperature falls below a threshold temperature.

According to another aspect, the computer device is configured for monitoring a temperature of the water in the water tank, determining a conductivity of the water in the water tank, and controlling the water heater to maintain the temperature of the water in the water tank based on the conductivity of the water. In one configuration, the assembly further includes a conductivity sensor connected to the water tank, and determining the conductivity of the water in the water tank is based on data from the conductivity sensor.

According to a further aspect, the computer device is configured for monitoring a temperature of the water in the water tank, calculating a set temperature that is below a desired temperature of the water in the water tank, such that the water can be heated from the set temperature to the desired temperature in a threshold time period, and controlling the water heater to maintain the temperature of the water in the water tank at the set temperature and to heat the temperature of the water rapidly to the desired temperature prior to dispensing of the water from the water dispenser assembly. In one configuration, calculating the set temperature is performed based on a conductivity of the water in the water tank, which may include determining the conductivity of the water in the water tank based on data from a conductivity sensor connected to the water tank.

According to yet another aspect, the computer device is configured for determining an anticipated future usage of the water dispenser assembly to dispense the water from the water tank, where controlling the water heater to heat the temperature of the water rapidly to the desired temperature is performed based on the anticipated future usage.

According to a still further aspect, the computer device is configured for receiving an activation indication; and controlling the water heater to heat the water in the water tank from the set temperature to the desired temperature in response to the activation indication.

According to an additional aspect, calculating the set temperature includes determining a heating rate of the water heater for heating the water in the water tank, determining the threshold time period, calculating the set temperature below the desired temperature, based on the heating rate and the threshold time period such that the water heater is capable of heating the water in the water tank from the set temperature to the desired temperature within the desired delay time. In one configuration, the water heater is a conductive water heater, and wherein determining the heating rate of the water heater includes determining a conductivity of the water in the water tank, and determining the heating rate of the water heater based on the conductivity of the water in the water tank and a power output of the water heater. In another configuration, the heating rate of the water heater is further determined based on a volume of the water in the water tank.

Additional aspects of the disclosure relate to a hand washing station that includes a support structure configured for mounting in a place of use, a water heater including a water tank and a heating element configured to heat water contained in the water tank, the water tank having an inlet conduit connected to a water source and an outlet conduit, where the water heater is engaged with the support structure, and a water outlet connected to the outlet conduit and configured to receive water from the water heater through the outlet conduit. The water outlet includes a spray nozzle, and the water outlet is supported by the support structure. The station further includes a valve in fluid communication with the water heater and configured to selectively permit the water to be forced from the water tank and through the water outlet to dispense the water. The spray nozzle may be a low-flow nozzle with a wide angle spray in one configuration, and/or the water outlet may include a plurality of such nozzles. Additionally, in one configuration, the inlet conduit is configured for direct connection to a water stop.

According to one aspect, the water heater is configured to maintain the water in the water tank at a desired temperature.

According to another aspect, the water heater is configured to maintain the water in the water tank at a set temperature below a desired temperature and to rapidly heat the water from the set temperature to the desired temperature before the water is dispensed.

According to a further aspect, the valve is located on the inlet conduit, and the inlet conduit is pressurized upstream of the valve so that the water tank is not pressurized when the valve is in a closed position.

Further aspects of the disclosure relate to a hand washing station that includes a support structure configured for mounting in a place of use, a water heater having a water tank and a heating element configured to heat water contained in the water tank, the water tank having an inlet conduit connected to a water source and an outlet conduit, wherein the water heater is engaged with the support structure, and a plurality of water outlets connected to the outlet conduit and configured to receive water from the water heater through the outlet conduit. The water outlets are supported by the support structure, and the station also includes a plurality of valves in fluid communication with the water heater and connected to the outlet conduit, where the valves are configured and positioned to selectively permit the water to be forced from the water tank and through one or more of the water outlets to dispense the water.

According to one aspect, the station further includes a plurality of actuators, each actuator corresponding to one of the plurality of water outlets. The actuators are in operably connected to the plurality of valves such that activation of each actuator is configured to actuate the valves to permit the water to be forced from the water tank through the water outlet corresponding to the actuator. In one configuration, the plurality of actuators include a first actuator corresponding to a first water outlet of the plurality of water outlets, the first water outlet being in fluid communication with the outlet conduit by a first branch conduit having a first valve of the plurality of valves, and where the first actuator is configured to actuate the valves to permit the water to be forced from the water tank through the first water outlet by opening the first valve. In another configuration, the plurality of actuators include a first actuator corresponding to a first water outlet of the plurality of water outlets, where the first actuator is configured to actuate the valves to permit the water to be forced from the water tank through the first water outlet by closing one or more of the valves to prevent water flow through other water outlets of the plurality of water outlets. In a further configuration, the station includes an inlet valve located on the inlet conduit, where the activation of each of the actuators is configured to open the inlet valve to permit the water to be forced from the water tank through the water outlet corresponding to the actuator.

According to another aspect, the support structure includes a lower shelf supporting one or more basins, an upper shelf supporting the plurality of water outlets above the one or more basins, and a base connected to the lower shelf and the upper shelf, wherein the water tank is located within the base. In one configuration, at least a soap dispenser and/or a hand dryer are engaged with the support structure.

Additional aspects of the disclosure relate to a hand washing station that includes a basin having a drain, a water dispenser having a water outlet positioned over the basin and configured to dispense water, where the water dispenser is positioned and directed to dispense the water into the basin, and a soap dispenser having a soap outlet positioned over the basin and configured to dispense soap. The basin is contoured to define a water flow path from the water dispenser to the drain, and the soap dispenser is positioned directly over the water flow path. The soap dispenser may be positioned directly over the drain in one configuration, or may be positioned between the water outlet and the drain in another configuration.

According to one aspect, the station includes a support structure having a lower shelf supporting the basin and an upper shelf supporting the water outlet and the soap outlet above the basin.

According to another aspect, the basin further includes a trough that is sloped downwardly between the water outlet and the drain to define the water flow path, and the soap dispenser is positioned above the trough and directed to dispense the soap into the trough.

According to a further aspect, the water dispenser further includes a water heater including a water tank and a heating element configured to heat water contained in the water tank, the water tank having an inlet conduit connected to a water source and an outlet conduit connected to the water outlet configured for dispensing the water in the water tank through the water outlet.

Still further aspects of the disclosure relate to a hand washing station that includes a basin having a drain, a water dispenser having a water outlet positioned over the basin and configured to dispense water, where the water dispenser is positioned and directed to dispense the water into the basin, and a soap dispenser having a soap outlet positioned directly over the drain and configured to dispense soap.

According to one aspect, the station includes a support structure having a lower shelf supporting the basin and an upper shelf supporting the water outlet and the soap outlet above the basin.

According to another aspect, the basin further includes a trough that is sloped downwardly between the water outlet and the drain, and wherein the drain is located within the trough.

Still other aspects of the disclosure relate to a hand washing station that includes a water heater having a water tank and a heating element configured to heat water contained in the water tank, the water tank having an inlet conduit connected to a water source and an outlet conduit, a water outlet connected to the outlet conduit and configured to receive water from the water heater through the outlet conduit, and a valve in fluid communication with the water heater and configured to selectively permit the water to be forced from the water tank and through the water outlet to dispense the water. The station further includes a hand dryer configured for blowing heated air through a dryer output, the hand dryer having a heat exchanger engaged with a portion of the hand dryer and the inlet conduit, where the heat exchanger is configured to heat water in the inlet conduit by absorption of heat from the hand dryer.

According to one aspect, the station includes a support structure having a lower shelf supporting a basin, an upper shelf supporting the water outlet and the dryer output above the basin, and a base connected to the upper shelf and the lower shelf, where the heat exchanger and the portion of the hand dryer are at least partially contained within the base. In one configuration, the water heater and the hand dryer are at least partially contained within the base.

Additional aspects of the disclosure relate to a hand washing station that includes a basin having a drain, a water heater having a water tank and a heating element configured to heat water contained in the water tank, the water tank having an inlet conduit connected to a water source and an outlet conduit, and a water outlet connected to the outlet conduit and configured to receive water from the water heater through the outlet conduit and to dispense water from the water tank into the basin. The station also includes a hand dryer configured for blowing heated air through a dryer output located over the basin, where the basin has a front configured to be positioned adjacent a user location, a rear opposite the front, and lateral sides extending between the front and the rear, and the basin has sloping surfaces extending inward and downward from the lateral sides, such that the sloping surfaces are configured to direct heated air blown through the dryer output out of the basin at the lateral sides.

According to one aspect, the station includes a support structure having a lower shelf supporting the basin and an upper shelf supporting the water outlet over the basin, where the support structure has openings between the upper shelf and the lower shelf located at the lateral sides of the basin, and the sloping surfaces are further configured to direct heated air blown through the dryer output out of the basin through the openings.

According to another aspect, the basin has a trough in which the drain is located, and the sloping surfaces extend inward from the lateral sides to the trough.

According to a further aspect, the basin further has a front sloping surface extending inward and downward from the front of the basin and a rear sloping surface extending inward and downward from the rear of the basin.

According to a still further aspect, the station further includes a vent located at the front of the basin, the vent having an entrance within the basin and an exit beneath the basin, where the vent is configured to direct the heated air blown through the dryer output to a location beneath the basin. In one configuration, a lip is connected to the basin and extends rearward over the vent.

Yet additional aspects of the disclosure relate to a hand washing station including a support structure configured for mounting in a place of use, the support structure having an upper shelf and a lower shelf located below the upper shelf, a basin having a drain, where the basin is supported by the lower shelf, and a water dispenser having a water outlet supported over the basin by the upper shelf and configured to dispense water, where the water dispenser is positioned and directed to dispense the water into the basin. The basin has a trough in which the drain is located, a front configured to be positioned adjacent a user location, a rear opposite the front, and lateral sides extending between the front and the rear, and where the basin has a front sloping surface extending inward and downward from the front to the trough, a rear sloping surface extending inward and downward from the rear to the trough, and lateral sloping surfaces extending inward and downward from the lateral sides to the trough. The trough may be sloped toward the drain in one configuration.

According to one aspect, the trough has vertical side walls intersecting and depending from the front sloping surface, the rear sloping surface, and the lateral sloping surfaces.

Additional aspects of the disclosure relate to a hand washing station including a support structure configured for mounting in a place of use, a basin having a drain, where the basin is supported by the support structure, and a water dispenser having a water outlet positioned over the basin and configured to dispense water, where the water dispenser is positioned and directed to dispense the water into the basin. The station may further include a cleaning nozzle connected to the support structure and directed into the basin, where the cleaning nozzle is separate from the water outlet and configured to expel a cleaning fluid into the basin for cleaning the basin. The cleaning fluid may be or include water in one configuration. Additionally, the cleaning nozzle may be mounted within the basin in one configuration.

According to one aspect, the cleaning nozzle is mounted at a front of the basin and is positioned and directed to expel the cleaning fluid rearwardly into the basin. In one configuration, a lip is connected to the support structure at the front of the basin and extends rearwardly toward the basin, and the cleaning nozzle is mounted beneath the lip.

According to another aspect, the station further includes a plurality of cleaning nozzles connected to the support structure and directed into the basin, where the cleaning nozzles are separate from the water outlet and configured to expel the cleaning fluid into the basin for cleaning the basin.

According to a further aspect, the station includes a computer device in communication with the cleaning nozzle, where the computer device is programmed with computer-executable instructions that, when executed, cause a processor of the computer device to transmit a signal to activate the cleaning nozzle at a predetermined cleaning time.

Other aspects of the disclosure relate to a system that includes a hand washing station including a basin having a drain, a water dispenser having a water outlet positioned over the basin and configured to dispense water, where the water dispenser is positioned and directed to dispense the water into the basin, and a sensor configured to sense at least one usage parameter of the hand washing station. The system includes a computer device in communication with the hand washing station, where the computer device is programmed with computer-executable instructions that, when executed, cause a processor of the computer device to receive usage data from the sensor and to take further action based on analysis of the usage data.

According to one aspect, the further action includes generating a usage report for the hand washing station and displaying the usage report on a display in communication with the computer device.

According to another aspect, the further action includes transmitting an indication of a service to be performed on the hand washing station.

According to a further aspect, the further action includes transmitting an order for a service to be performed on the hand washing station.

According to yet another aspect, the further action includes transmitting an order for replenishment of a supply component used in connection with the hand washing station.

According to a still further aspect, the further action includes analyzing the usage data to predict a period of low usage and placing the hand washing station in a sleep mode during the period of low usage. An occupancy sensor may be included in communication with the computer device, where the computer device is further configured to receive occupancy data from the occupancy sensor and to place the hand washing station out of the sleep mode when the occupancy data indicates an occupant in proximity to the hand washing station.

Other aspects of the disclosure relate to a facility that includes a plurality of hand washing stations each configured for dispensing water from a water outlet, and a computer device connected to the hand washing stations, the computer device programmed with computer-executable instructions that, when executed, cause a processor of the computer device to control operation of the plurality of hand washing stations.

According to one aspect, the facility further includes one or more occupancy sensors positioned within the facility and configured to monitor presence of users within the facility. In one configuration, the computer device may be configured for receiving occupancy data from the one or more occupancy sensors, and controlling operation of the plurality of hand washing stations based on the occupancy data. In another configuration, the computer device may be configured for receiving occupancy data from the one or more occupancy sensors, determining a room occupancy index indicating a proportion of a maximum workload of the facility that is necessary based on the occupancy data, controlling the plurality of hand washing stations to operate in a first mode if the room occupancy index exceeds an occupancy threshold, and controlling the plurality of hand washing stations to operate in a second mode different from the first mode if the room occupancy index does not exceed an occupancy threshold.

Other aspects of the disclosure relate to methods of operation of a water dispenser, a hand washing station, a system, or a facility as described herein, using a computer device for various determining, monitoring, controlling, and other actions, as well as a computer device provided with computer-executable instructions configured to cause a processor to perform such actions, and a computer-readable medium programmed with such computer-executable instructions.

Other features and advantages of the disclosure will be apparent from the following description taken in conjunction with the attached drawings.

BRIEF DESCRIPTION OF THE DRAWINGS

To understand the present invention, it will now be described by way of example, with reference to the accompanying drawings in which.

DETAILED DESCRIPTION

Figure 1:
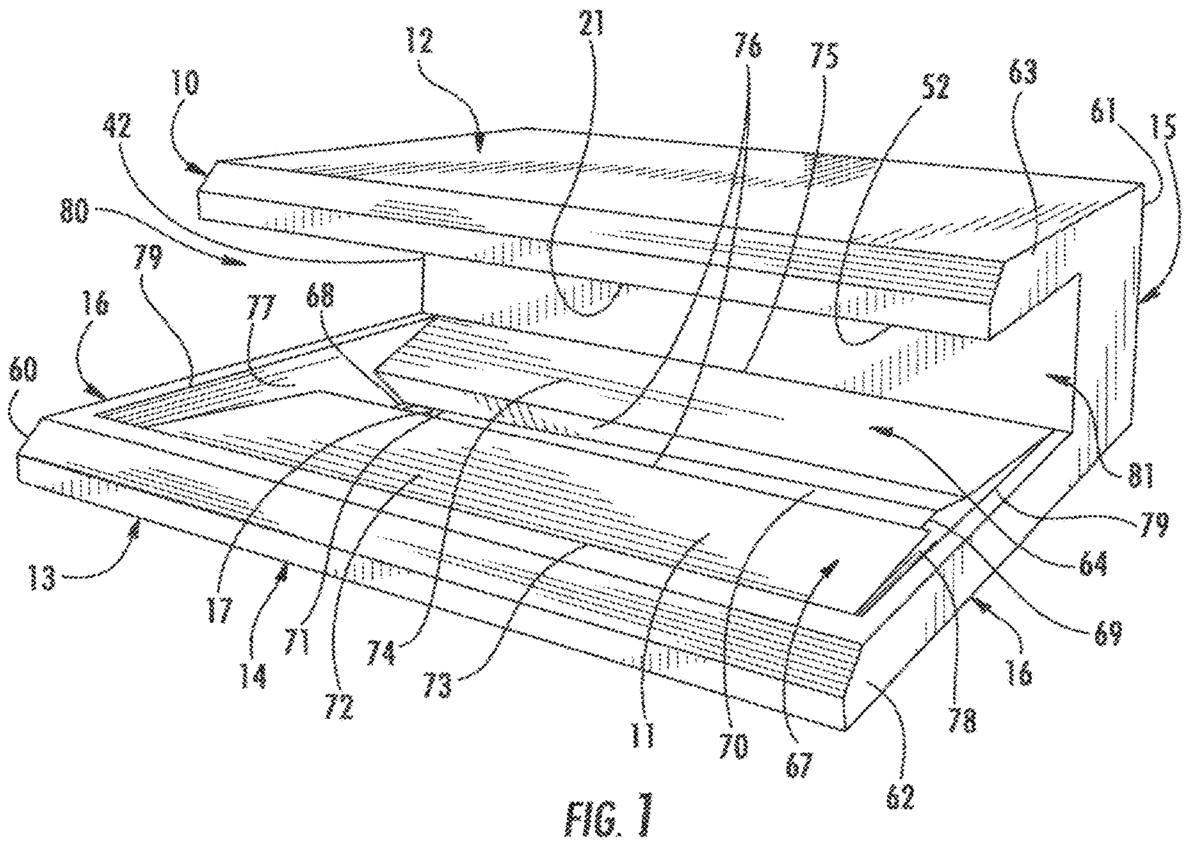
FIG. 1 is a top-right perspective view of one embodiment of a hand washing station according to aspects of the disclosure.
Figures 2, 3:
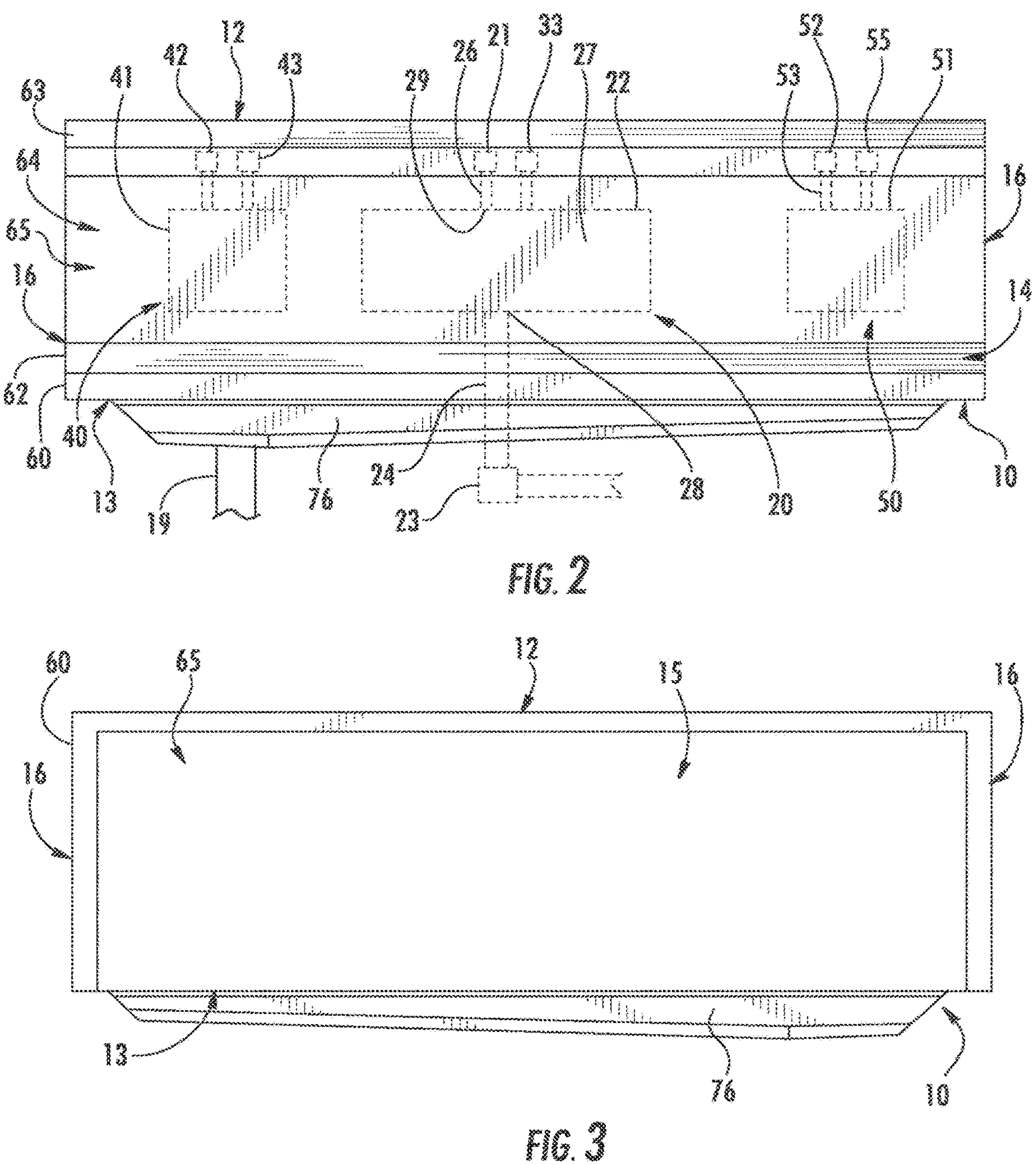
FIG. 2 is a front view of the hand washing station of FIG. 1, with broken lines schematically showing internal detail.
FIG. 3 is a rear view of the hand washing station of FIG. 1.
Figure 4:
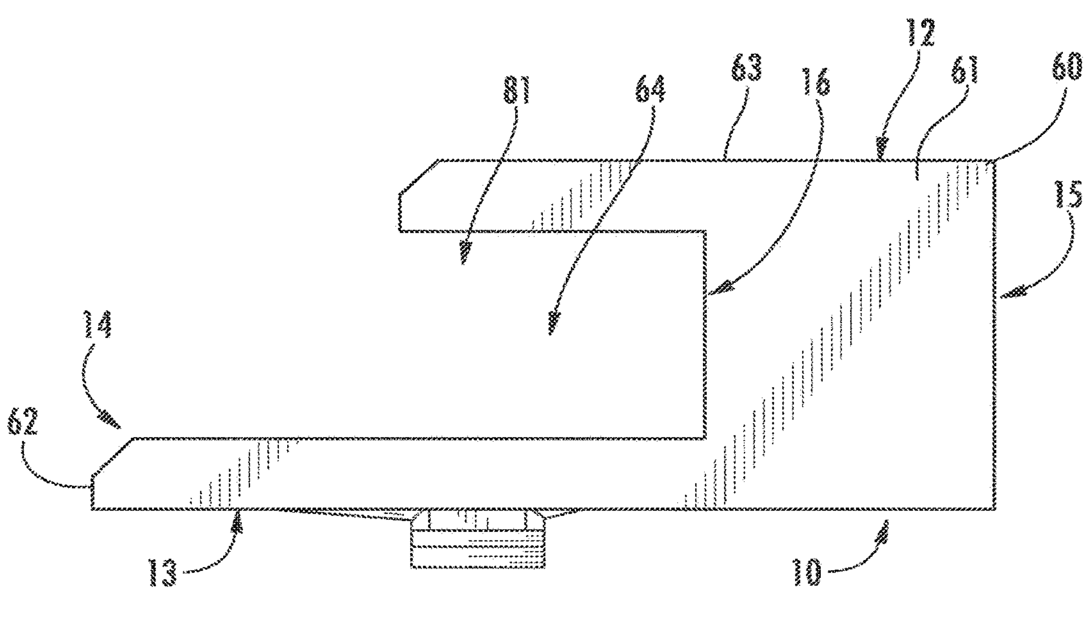
FIG. 4 is a right side view of the hand washing station of FIG. 1.
Figure 5:
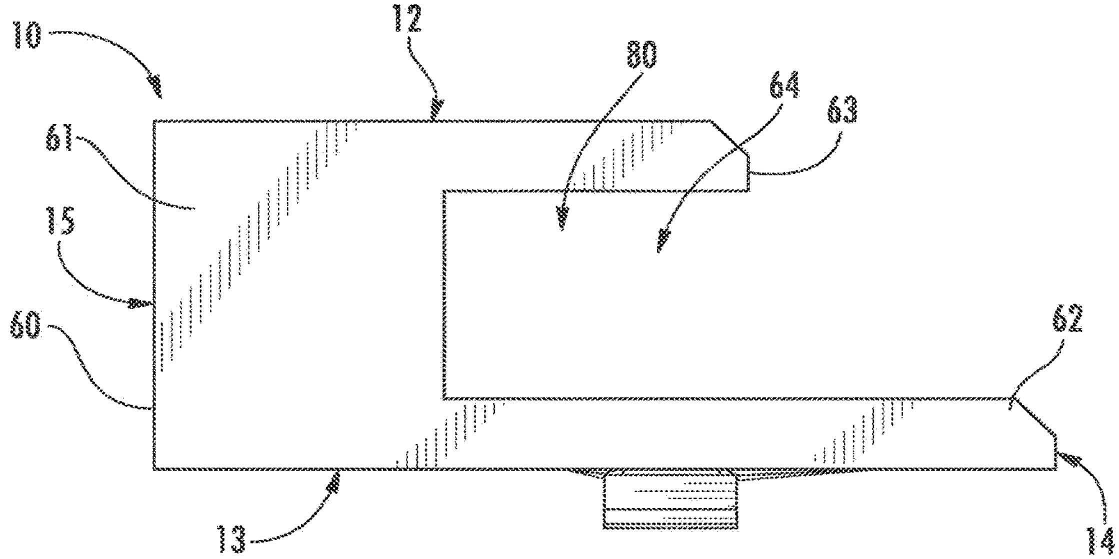
FIG. 5 is a left side view of the hand washing station of FIG. 1.
Figure 6:
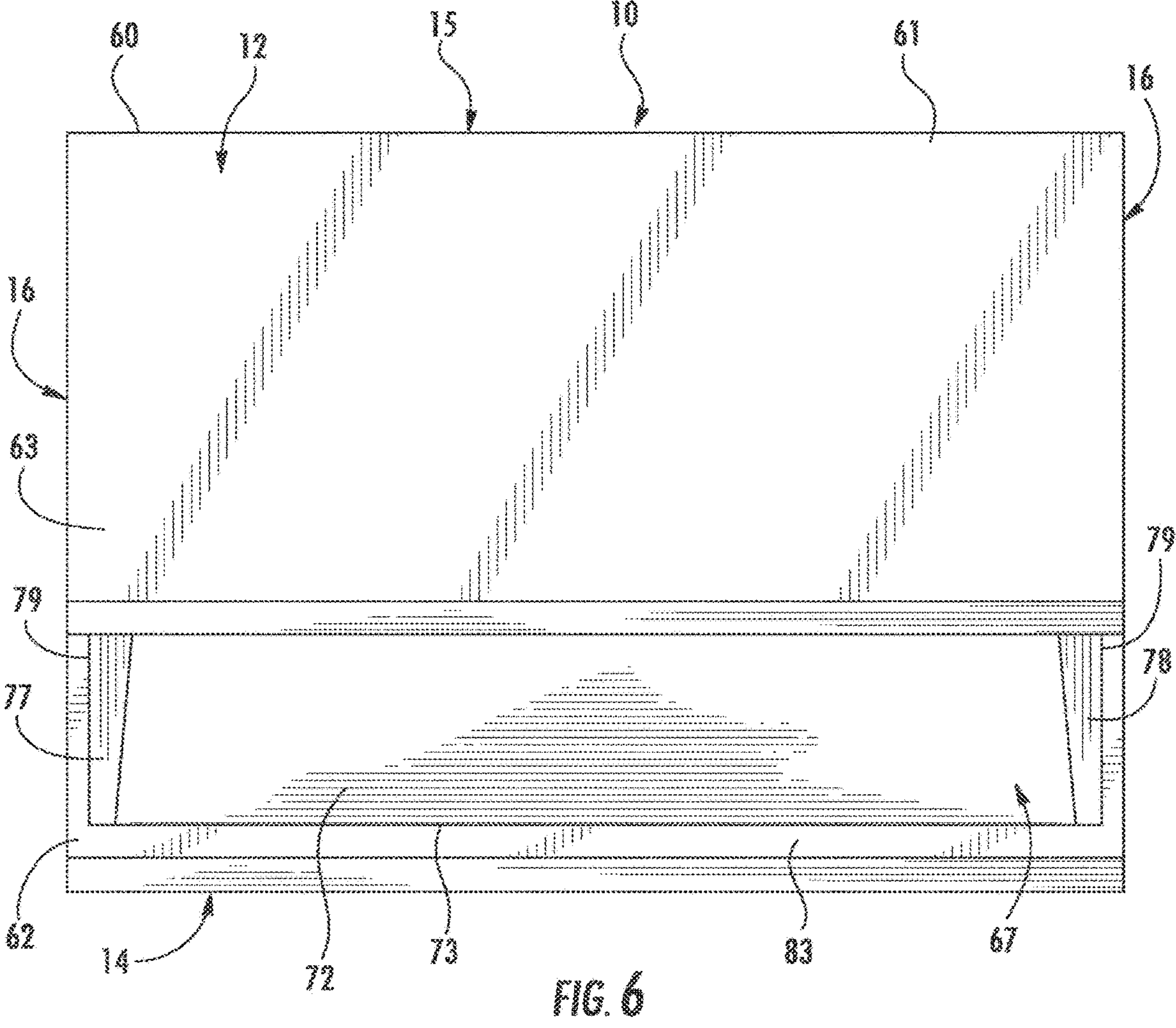
FIG. 6 is a top view of the hand washing station of FIG. 1.

While this invention is capable of embodiment in many different forms, there are shown in the drawings, and will herein be described in detail, certain embodiments of the invention with the understanding that the present disclosure is to be considered as an example of the principles of the invention and is not intended to limit the broad aspects of the invention to the embodiments illustrated and described.

Referring to the figures, and initially to FIGS. 1-9, there is shown one embodiment of a hand washing station, identified by reference numeral 10. In various embodiments, the hand washing station 10 may include one or more of a basin 11, a water dispenser assembly or water dispenser 20, a soap dispenser assembly or soap dispenser 40, a hand dryer assembly or hand dryer 50, and a frame or support structure 60 supporting the water dispenser 20, the soap dispenser 40, and/or the hand dryer 50. The station 10 may also include a computer system 100 that includes various features for controlling and/or monitoring components of the station 10. The hand washing station 10 in FIGS. 1-9 is provided as an integrated sink that includes all of these features. Various additional components and embodiments are described herein. The basin 11 is supported and defined by the frame 60 as described in more detail herein, and the basin 11 may have a drain 17 for drainage of water from the basin 11. The hand washing station 10 generally has a top 12, a bottom 13 opposite the top 12, a front 14, a rear 15 opposite the front 14, and opposed left and right sides 16. The rear 15 of the hand washing station 10 can be mounted to a wall 18 in the embodiment of FIGS. 8-9, and a water supply 25 connected to the water dispenser 20 and a drain pipe 19 connected to the drain 17 extend into the wall 18 in this embodiment. The drain pipe 19 may include a trap 19A as known in the art. The following directions and orientations will be used in describing components of the hand washing station 10 herein, with the understanding that these directions and orientations are illustrative with to the drawing figures shown and do not limit the embodiments in any way. The "vertical" direction is a top-to-bottom direction extending parallel to the wall 18 on which the hand washing station 10 is mounted and between the top 12 and the bottom 13 of the hand washing station. The "longitudinal" direction is a front-to-rear direction extending perpendicular to the wall 18 and between the front 14 and the rear 15 of the hand washing station 10. The "lateral" direction is a side-to-side direction extending parallel to the wall 18 and between the sides 16 of the hand washing station 10.

Figure 7:
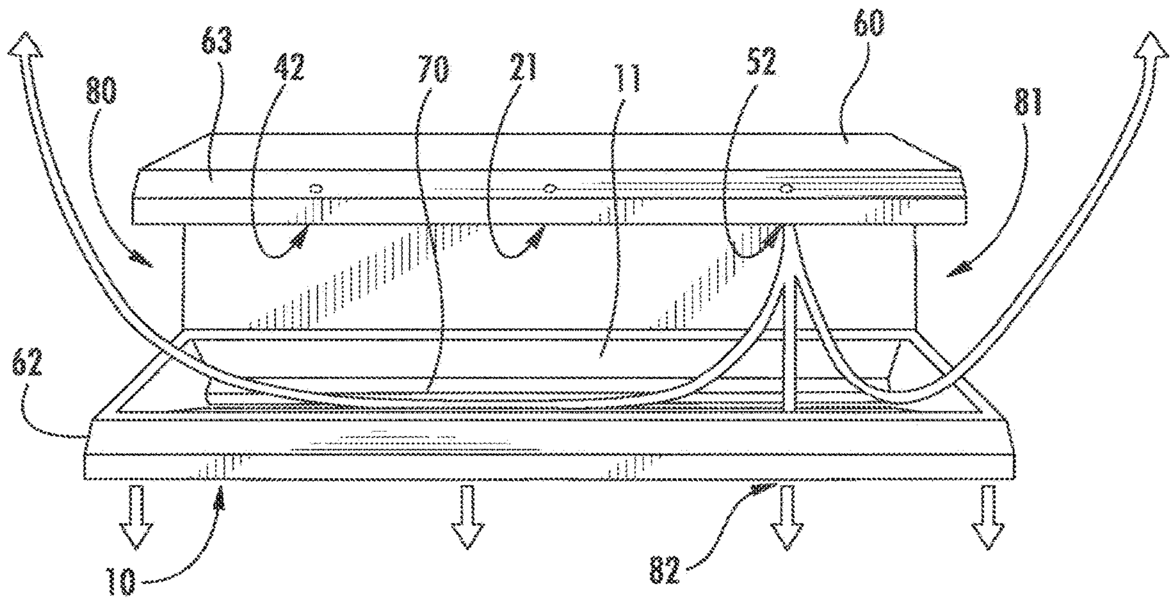
FIG. 7 is a front elevation view of the hand washing station of FIG. 1, with arrows illustrating airflow.
Figure 8:
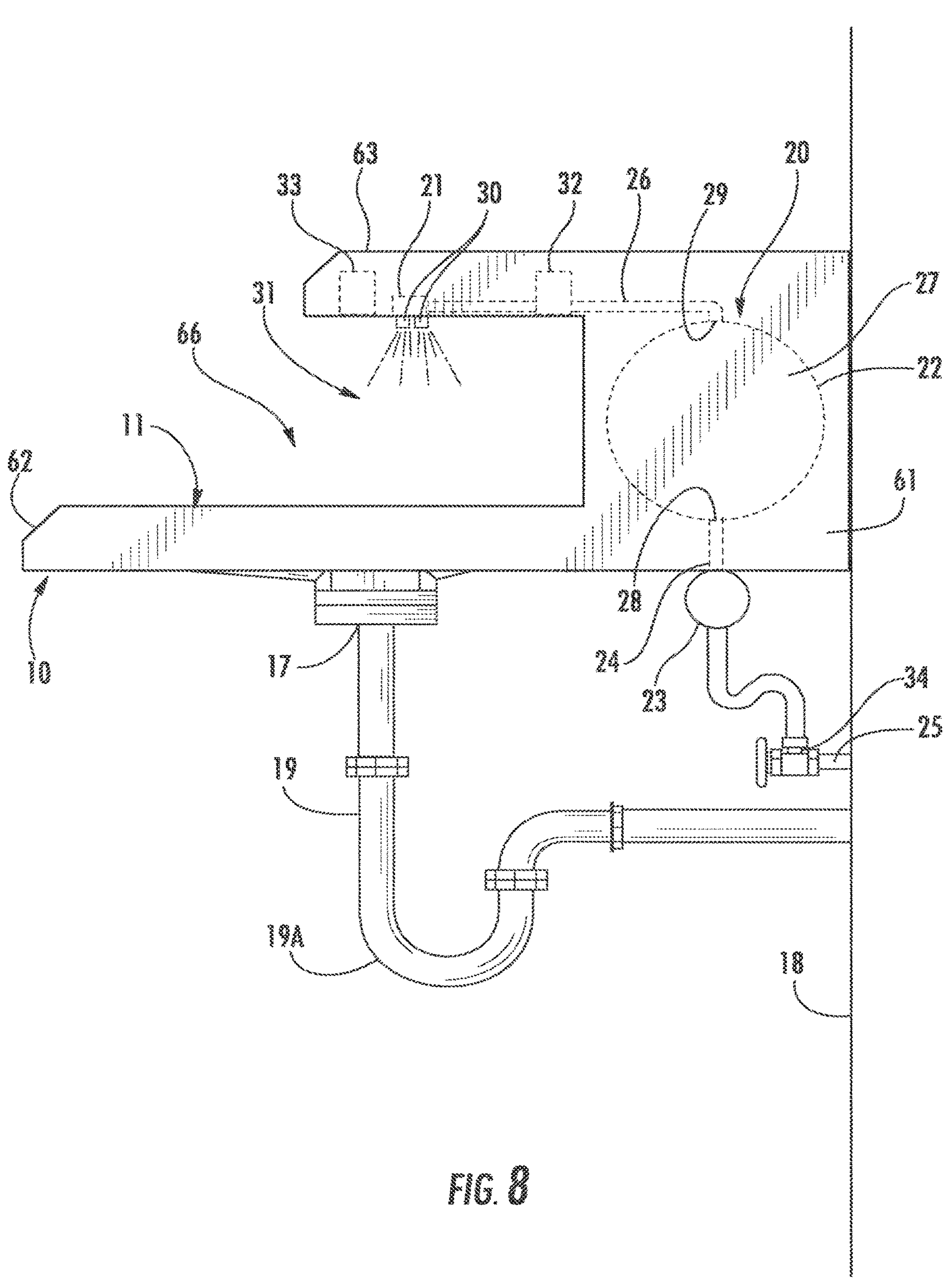
FIG. 8 is a right side view of the hand washing station of FIG. 1 installed on a wall, with broken lines showing internal detail.

The water dispenser 20 in the embodiment of FIGS. 1-9 includes at least a water outlet 21, a water heater 22 in communication with the water outlet 21, and a valve 23 positioned upstream of the water heater 22. An inlet conduit 24 connects the water heater 22 to the water supply 25, and an outlet conduit 26 connects the water heater 22 to the water outlet 21. The water supply 25 in one embodiment is a cold water supply that includes a stop 34 extending from the wall 18 and connected to the inlet conduit 24. No hot water line is used in the embodiment of FIGS. 1-9, simplifying installation of the station 10. Generally, the water dispenser 20 may have an actuator 33 (shown schematically in FIG. 8) configured to activate the water dispenser 20 to dispense water, or in the case of a water dispenser 20 with multiple water outlets 21, the water dispenser may have actuators 33 associated with each water outlet 21 individually. The actuator 33 illustrated in FIG. 8 is an automatic electronic actuator that includes a user proximity sensor to sense when a user's hands are in position for washing (e.g., by having a sensing zone pointed downward into the basin 11), and the valve 23 can then be opened and closed electronically. In other embodiments, a different type of actuator 33 may be used, including a mechanical actuator that mechanically opens the valve 23 or an electro-mechanical actuator 33 that mechanically or electronically opens the valve 23. Additional components may be included in other embodiments, such as additional water outlets 21, additional conduits, and/or various different valves in different locations.

In an exemplary embodiment, the water heater 22 is a conductive water heater that heats water through exciting natural salts and minerals found in water and includes one or more heating elements (not shown) configured to heat water using a conductive heating mechanism. The water heater 22 has a water tank 27 where the water is heated by the heating element, with an inlet 28 located on a bottom side of the tank 27 that is connected to the inlet conduit 24 and an outlet 29 located on a top side of the tank 27 that is connected to the outlet conduit 26. Water flows into the tank 27 through the inlet 28 and flows out of the tank 27 through the outlet 29 in this configuration. The water heater 22 is configured to maintain the water contained in the tank 27 at or around a desired temperature, which may be a comfortable hand washing temperature in one embodiment. It is understood that the desired temperature may be defined by a range of temperatures, such as 95-105° F. Various techniques may be used to accomplish this function, and a computer system may be used in connection with such techniques. For example, the water heater 22 may be configured to heat the water when the water falls below a lower threshold temperature and to continue heating the water until an upper threshold temperature is reached. As another example, the water heater 22 may be configured to maintain the water at a set temperature lower than the desired temperature and to rapidly heat the water to the desired temperature when the water dispenser 20 is activated. These and other techniques for maintaining the water temperature, as well as the use of a computer system in connection with the same, are described in greater detail elsewhere herein.

Figure 20:
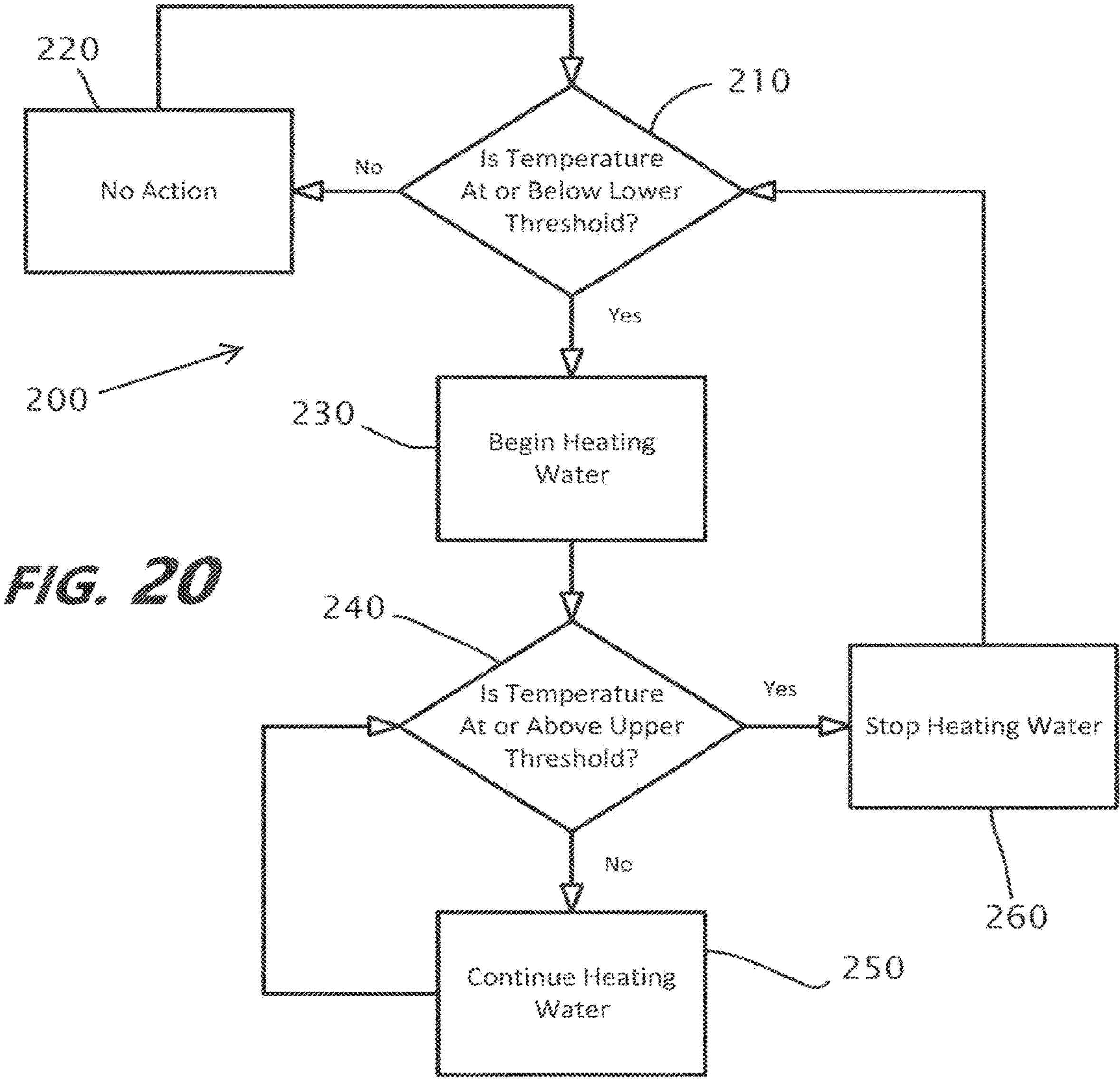
FIG. 20 is a schematic view of one embodiment of a method of operation that is usable in connection with a hand washing station according to aspects of the disclosure.

FIG. 20 illustrates one embodiment of a method 200 for maintaining the temperature of water in the water tank 27 at a set temperature, using lower and upper threshold temperatures, some or all of the steps of which may be practiced using a computer system 100 as described herein. The temperature of the water may be checked using some or all of the thermal sensors 91, 92, 93 described herein. At step 210, the temperature of the water is checked to determine whether the temperature is at or below the lower threshold. If the water temperature is above the lower threshold, no action is taken at step 220, and the method 200 returns to step 210. If the water temperature is below the lower threshold, the water heater 22 begins heating the water in the water tank 27 at step 230. The temperature of the water is then checked to determine whether the temperature is at or above the upper threshold at step 240. Until the upper threshold is reached, the water heater 22 continues heating the water at step 250 and returns to step 240. Once the upper threshold is reached, the heating stops at step 260, and the method returns to step 210.

Figure 21:
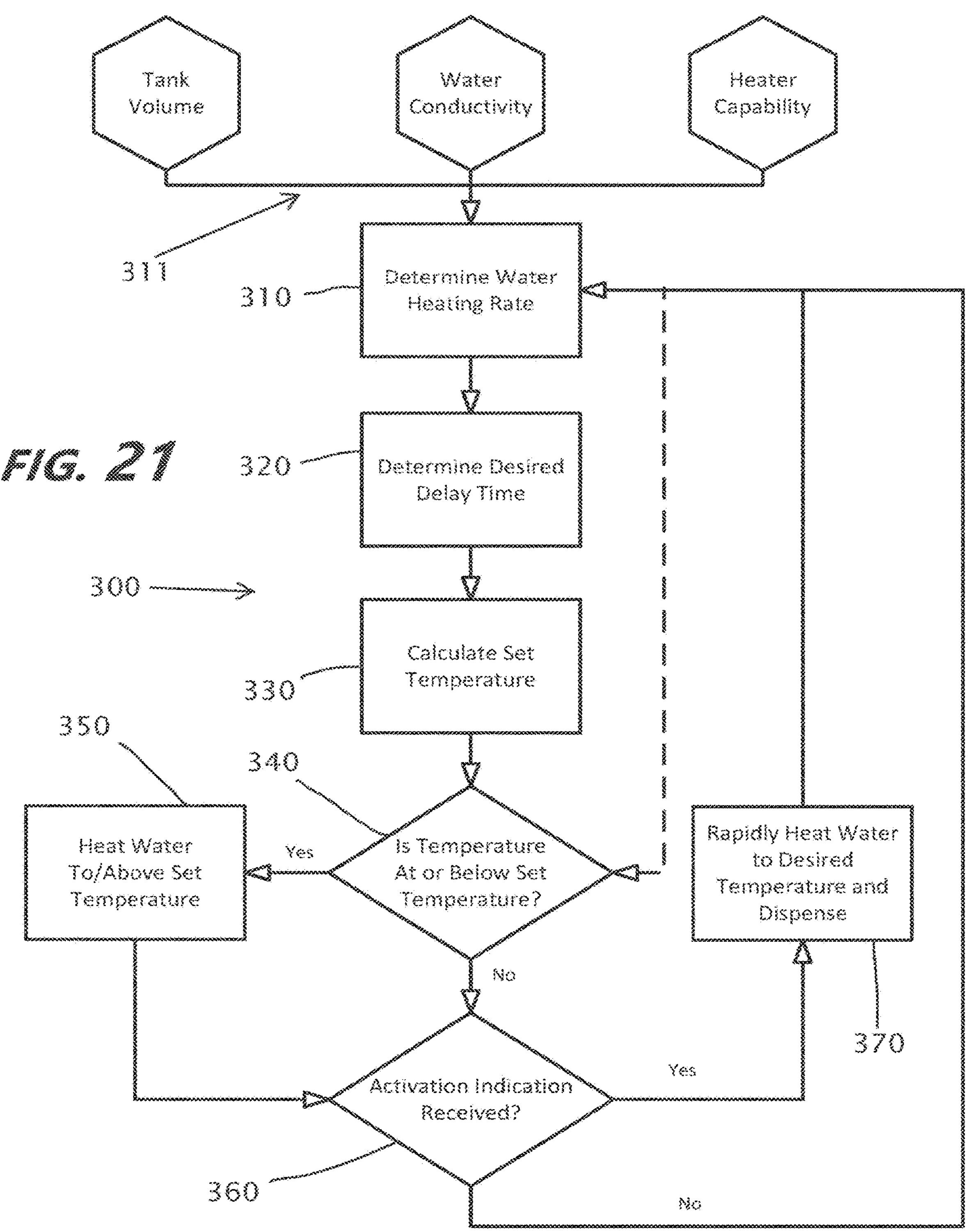
FIG. 21 is a schematic view of another embodiment of a method of operation that is usable in connection with a hand washing station according to aspects of the disclosure.

FIG. 21 illustrates one embodiment of a method 300 for energy conservation by maintaining the water temperature at a set temperature lower than the desired temperature, some or all of the steps of which may be practiced using a computer system 100 as described herein. In various embodiments, the set and desired temperatures may be the temperature in the water tank 27, in the inlet conduit 24, or in the outlet conduit 26, which may be measured by thermal sensors 91, 92, 93 discussed elsewhere herein. In FIG. 21, the rate at which the water heater 22 can heat the water is determined at step 310. This determination may be based on several factors 311, depending on the type of water heater 22 used. In general, the determination may be based at least on the volume of water in the water heater 22 and the capability (e.g., power output) of the heating element of the water heater 22. The properties of the water itself may factor into the calculation as well. The factors 311 used in the determination of the water heating rate may be measured using sensors, known/estimated based on preexisting data stored in memory, or received from another computer device, or the water heating rate itself may be based on preexisting data that is stored or received. In an embodiment with a conductive water heater as described herein, the water conductivity may also be a factor 311 in the analysis, as the rate at which the water heater 22 can heat the water will depend on the conductivity. The water conductivity value may be measured by a conductivity sensor 94 or determined using other methods described herein. Other factors 311 may be used as well, depending in part on the type of water heater 22 used.

At step 320, the desired delay time for heating the water from the set temperature to the desired temperature is determined. This delay time may be selected by user input, received from an external source, and/or stored in memory. Additionally, the delay time may vary at different times of day, such as by having a shorter delay time during periods of expected heavy usage (e.g., during the day) and a longer delay time during periods of expected light usage (e.g., at night). As described elsewhere herein with respect to FIG. 22, occupancy data can be used in determining the set temperature and/or the delay time.

At step 330, the set temperature is calculated based at least on the delay time and the water heating rate. In one embodiment, the set temperature may be calculated by multiplying the delay time (sec) by the water heating rate (° F./sec) to yield the difference between the set temperature and the desired temperature.

At step 340, the temperature is checked (e.g., using one or more of the thermal sensors 91, 92, 93) to determine whether the temperature has fallen below the set temperature. If the temperature has fallen below the set temperature, the water is heated to at least the set temperature at step 350, which may be performed according to the method of FIG. 20 described herein.

If an activation indication is received, at step 360, then the water is rapidly heated to the desired temperature and dispensed when the actuator 33 is activated. The activation indication may be based on activation of the actuator 33 in one embodiment. In another embodiment, the activation indication may be based on input from an occupancy sensor, a user proximity sensor, or another sensor as described herein to heat the water in anticipation of an imminent activation, and the water is dispensed after activation of the actuator 33. In a further embodiment, the temperature may be maintained at a first set temperature until a first activation indication is received based on input from an occupancy sensor, at which point the temperature is raised to a second, higher set temperature (which may be at or below the desired temperature) that is maintained until a second activation indication is received based on activation of the actuator 33, at which point the temperature is heated to the desired temperature (if necessary) and the water is dispensed. If no activation indication is received at step 360, the method returns in a loop to step 310 or to step 340. The method may be configured return to step 310 if it is possible that the set temperature may vary, such as based on a change in the factors 311 (e.g., a change in water conductivity) or a change in the desired delay time. The method may be alternately configured to return to step 340 if it is not necessary to adjust the set temperature. In a further embodiment, the method may generally return to step 340, but may return to step 310 for re-adjustment of the set temperature periodically (e.g., at a specified time daily). The maintenance of the temperature below the desired temperature can offer large benefits in energy conservation. Additionally, the method 300 of FIG. 21 can be incorporated into or combined with the methods 400, 500 in FIGS. 22-24 to offer further benefits in energy conservation.

The water dispenser 20 in FIGS. 1-9 has a valve 23 positioned upstream of the water heater 22, within the inlet conduit 24 between the water heater and the water supply 25. The valve 23 may be a solenoid valve in one embodiment, or may be a bi-stable latching operator solenoid in another embodiment. Such a bi-stable valve will bias itself at low voltage toward the open or closed position, e.g., using a magnetic or mechanical biasing mechanism, and will only be moved to the other position (closed or open, respectively) when energy is expended to operate the valve. A bi-stable valve may be biased toward the open position in a heavy-use environment so that it is not necessary to expend energy to keep the valve 23 open when energy is needed for heating water in the water heater 22 or operating the blower motor 51. A bi-stable valve may be biased toward the closed position in a light-use environment so that it is not necessary to constantly expend energy to keep the valve 23 closed when the device is at rest. The valve 23 is closed when the water dispenser 20 is not dispensing water, thereby isolating the water heater 22 from the pressurized water supply 25. In this configuration, the tank 27 of the water heater 22 is not pressurized, and is under substantially atmospheric pressure (i.e., ~1 atm). When the water dispenser 20 is activated, the valve 23 opens, allowing water pressure to push water into the inlet 28 at the bottom of the tank 27, which pushes heated water out of the tank 27 through the outlet 29 and through the outlet conduit 26 to the outlet 21.

The water outlet 21 forms an outlet of the water dispenser 20 and directs water into the basin 11 of the hand washing station 10 to wet the hands of a user. The water outlet 21 may include one or more nozzles 30 in one embodiment that are configured to spray water downward into the basin 11, although the water outlet 21 may take another form in other embodiments. In the embodiment of FIGS. 1-9, the water outlet 21 may include five nozzles 30 that are distributed in one lateral row of three nozzles 30 and another lateral row of two nozzles 30 or seven nozzles 30 that are distributed in one lateral row of four nozzles 30 and another lateral row of two nozzles 30, with the two rows spaced longitudinally from each other. The nozzles 30 are generally positioned above the basin 11 and directed downward toward the basin 11 in the embodiment of FIGS. 1-9, and the nozzles 30 may be directed as desired. For example, the nozzles 30 may be directed substantially vertically downward in one embodiment or downward and slightly laterally at an angle toward the drain 17 in another embodiment, as discussed elsewhere herein. The nozzles 30 may also be directed longitudinally rearward, i.e., toward the rear 15 of the station 10, at an angle of up to 45° from the vertical. It is understood that if the angles of the nozzles 30 are not directly downward, any proximity sensor for the actuator 33 may be directed as appropriate to ensure that the user's hands are in the wetting area 31. In other embodiments, the water outlet 21 may take a different form and/or may not direct the water in a definable direction. A hand wetting area is 31 located in the path of the water exiting the water outlet 21, in which the water flows onto the user's hands when the water dispenser 20 is activated. In one embodiment, the nozzles 30 are configured to provide maximum water coverage and saturation in the wetting area 31 with a minimal amount of water expenditure. For this purpose, nozzles 30 that have a relatively fine, wide-angle spray configuration may be used.

Figure 16:
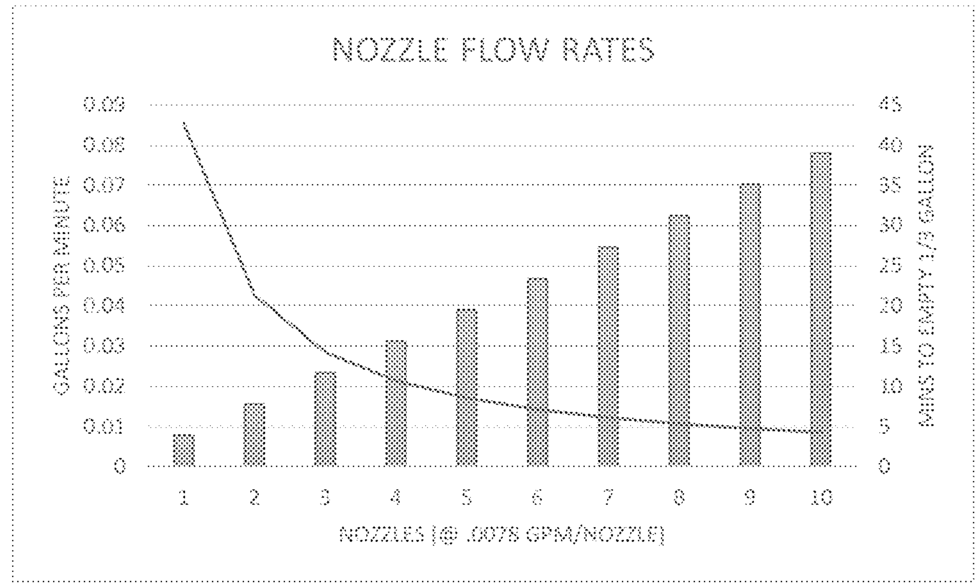
FIG. 16 is a graph illustrating the cumulative flow rate of a hand washing station according to aspects of the disclosure as a function of a number of nozzles present and also linearly illustrating the number of minutes necessary to empty a water tank.

In one embodiment, the water outlet 21 may be configured to provide a relatively low flow rate in comparison to the capacity of the tank 27 of the water heater 22. Due to this configuration, the relatively small inflow of cold water into the water heater 22 during activation of the water dispenser 20 does not significantly reduce the overall temperature of the water in the water heater 27, thereby reducing the energy necessary to maintain the temperature of the water. For example, in one embodiment, the tank 27 of the water heater 22 is approximately ⅓ gallon in capacity, and each of the nozzles 30 provides a flow rate of ⅛ cup per minute, e.g., 0.0075-0.01 gallons per minute (GPM). The flow rate of the water outlet 21 would depend on the number of nozzles 30 making up the water outlet 21. FIG. 16 illustrates an example of the cumulative flow rate of the water outlet 21 as a function of the number of nozzles 30 present and also linearly illustrates the number of minutes necessary to empty the water tank 27, assuming a flow rate of 0.0078 GPM per nozzle 30 and a tank size of ⅓ gallon. In the configuration described above with a water outlet 21 that includes five nozzles 30 at the flow rate illustrated in FIG. 16, the water outlet 21 would create a collective flow rate of about 0.04 GPM, and the water dispenser 20 would need to be active for over 8.5 minutes to completely drain the tank 27, and a typical hand washing rinse time of 10 seconds will only drain approximately 2% of the tank 27. It is understood that if a station 10 is configured to have multiple water outlets 21 connected to a single water heater 22, the cumulative flow rate is increased multiplicatively with each additional water outlet 21, and appropriate flow rates for the nozzles 30 may be selected based on the number of water outlets 21 present. The flow rates may also be selected based on the rate at which the water heater 22 is capable of heating the water, as a more rapid-heating water heater 22 may be usable with higher flow-rate nozzles 30 without dropping significantly in temperature. The expected usage rate of the station 10 may also be considered in selection of the flow rate, as more frequent use may require a lower flow rate in order for the water heater 22 to maintain the desired temperature. The use of a small water flow rate also conserves water by using only a fraction of the water volume that is typically used during hand washing at a standard sink in a commercial restroom. The relatively small capacity of the water tank 27 increases the efficiency of heating the water in the tank 27.

The water outlet 21, the water heater 22, and the outlet conduit 26 may be configured so the outlet 29 of the water heater 22 is at a minimal distance from the water outlet 21 in one embodiment. This configuration reduces the change in temperature of the water between leaving the water heater 22 and dispensing from the water outlet 21, so that the user receives water at a comfortable temperature. Additionally, water may not be delivered instantaneously in a water dispenser as illustrated in FIGS. 1-9, in comparison to a water dispenser with a pressurized spigot at the water outlet. A configuration with the water outlet 21 being positioned at a minimal distance from the water heater 22 also increases the speed at which water is delivered through the water outlet 21, so that delivery can be near instantaneous. In one embodiment, the distance between the water outlet 21 and the outlet 29 of the water tank 27 is no more than 10-30 inches, measured by piping length, i.e., the length of the outlet conduit 26. In the embodiment illustrated in FIGS. 1-9, this distance is approximately 10 inches. In one embodiment, the length of the outlet conduit 26 may be shorter than or comparable to that of the inlet conduit 24. For example, the length of the outlet conduit 26 may be no greater than 150% or 125% of the length of the inlet conduit 24.

In the embodiment illustrated in FIGS. 1-9, the tank 27 of the water heater 22 is not pressurized and is exposed to the atmosphere. Thus, the tank 27 is vented to the atmosphere through the outlet conduit 26 and the water outlet 21, eliminating the necessity of a pressure relief valve, which is often a requirement in existing systems. Water present in the outlet conduit 26 after the water dispenser 20 is deactivated can drain through the water outlet 21 via gravity. The outlet conduit 26 may have a slight arch or apex in order to assist draining by gravity. In another embodiment, it may be desirable to isolate and/or seal the tank 27 of the water heater 22 from the external environment, such as for sanitary reasons or to prevent evaporation of water in the tank 27 during periods of non-use. The water outlet 21 and/or the outlet conduit 26 may include a sealing mechanism, schematically illustrated by reference number 32 in FIG. 8. For example, the outlet conduit may include an in-line trap or valve (e.g., a one way check valve or duckbill valve) or other mechanical or electro-mechanical device that causes the stored water supply in the water heater to be "closed" to the atmosphere during periods of non-use with no line pressure. As another example, an additional valve or valves (e.g., solenoid) may be incorporated in the outlet conduit 26, at the water outlet 21, or individually within each nozzle 30. Further embodiments are contemplated for this purpose.

Figure 19:
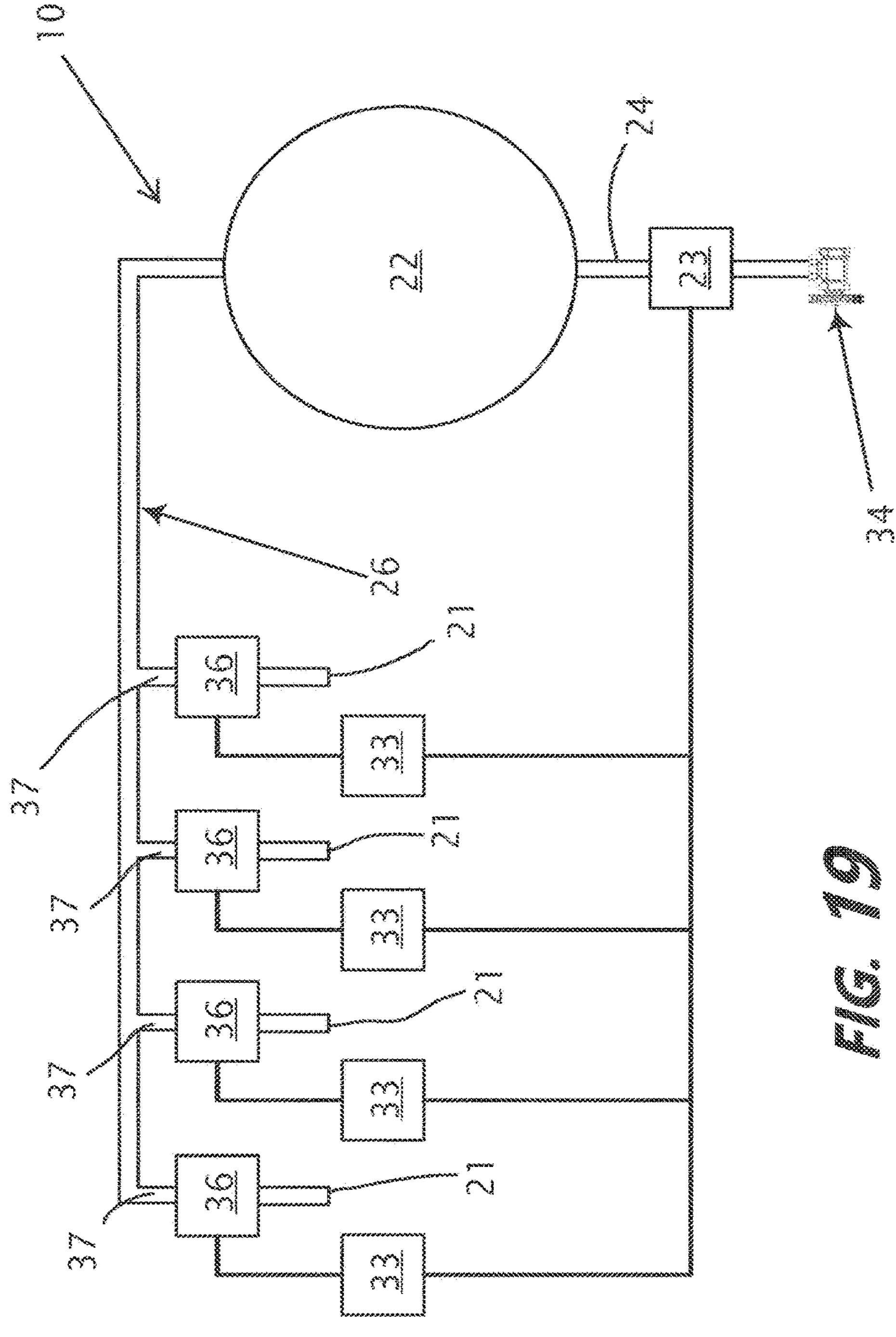
FIG. 19 is a schematic view of another embodiment of a hand washing station according to aspects of the disclosure.

In another embodiment, illustrated in FIG. 19, the hand washing station 10 may be configured to have multiple water outlets 21. For example, the station 10 may have multiple water outlets 21 connected to a single water heater 22, either by having a single outlet conduit 26 in communication with multiple water outlets 21 or having multiple outlet conduits 26. In configurations with multiple water outlets 21 connected to a single water heater 22, each water outlet 21 may have an individual actuator 33 and an individual valve 36 (e.g., a solenoid valve) that can open and close so that water flows only through the water outlet(s) 21 that is/are currently in use and/or demanded via the actuator 33 and instructions of the computer system 100. In the embodiment of FIG. 19, a single outlet conduit 26 connects the water heater 22 to all of the water outlets 21, with the outlet conduit 26 including branch conduits 37 extending to each water outlet 21 and an individual valve 36 configured for opening and closing each branch conduit 37. Such a configuration may operate by keeping all valves 36 open until one or more water outlets 21 are activated by user(s), then closing the valve(s) 36 associated with each water outlet 21 that is not activated. This permits drainage and venting through all water outlets 21 during non-use periods. Such a configuration may alternately operate by keeping some or all of the valves 36 closed until one or more water outlets 21 are activated by user(s), then opening the valve(s) 36 associated with each water outlet 21 that is activated. In this operation, a single valve 36 for a single water outlet 21 open during non-use to permit drainage, which may be the "last" water outlet 21 in line if the water outlets 21 are connected consecutively. The actuators 33 in the embodiment of FIG. 19 are connected to the valve 36 associated with the water outlet 21 corresponding to the actuator 33 and configured to actuate the valve 36, and the actuators 33 are further connected to the valve 23 in the inlet conduit 24, such that activation of the actuator 33 further commences water flow from the tank 27 through the outlet conduit 26. The actuators 33 in this embodiment are further connected with each other and capable of communication with each other, such that the actuators 33 can cooperate to open and close the valves 36 as needed to activate the water outlet(s) 21 associated with the actuator(s) 33 that are activated. It is understood that the communication between the actuators 33 and the valves 23,36 may be conducted through the computer system 100, and that the computer system 100 may direct the valves 23,36 to be opened and closed as appropriate to dispense water through the desired water outlet(s) 21 according to one of the configurations described herein. As another example, the station 10 may have multiple water heaters 22, each having one or more water outlets 21 connected thereto. It is understood that a hand washing station 10 configured as shown in FIG. 19 may include a support structure 60 that has a top shelf 63 supporting the plurality of water outlets 21, as well as one or more soap outlets 42 and/or air outputs 52 corresponding to the water outlets 21, a bottom shelf 62 supporting one or more basins positioned beneath the water outlets 21, and/or a base 61 that contains the water heater 22 and potentially other components as described herein.

The soap dispenser 40 generally includes a soap supply 41, a soap outlet 42, and an actuator 43 configured to be actuated by a user to cause the soap dispenser 40 to dispense soap. The actuator 43 is illustrated schematically in FIGS. 2 and 13 as an automatic electronic actuator that includes a user proximity sensor to sense when a user's hands are in position for washing, with an electronically activated pump and/or valve to cause soap to flow from the soap supply 41 through the soap outlet 42. In other embodiments, a different type of actuator 43 may be used, including a mechanical actuator that causes soap to be dispensed mechanically, e.g., a lever or piston mechanism, or an electro-mechanical actuator 43 that mechanically or electronically causes soap to be dispensed. The soap outlet 42 illustrated in FIGS. 1-9 is positioned directly or substantially directly above the drain 17, which causes excess soap to drip into the drain 17, where it is easily washed away. In another embodiment, the soap outlet 42 may be positioned away from the drain 17 but within the water flow path between the water outlet 21 and the drain 17. These configurations present advantages over existing soap dispensers, which often drip onto counters and/or the sides of a sink outside the water flow path, necessitating frequent cleaning to avoid buildup. The configuration of the frame 60 permits these arrangements. In other embodiments, the hand washing station 10 may include multiple soap dispensers 40 that may include multiple soap outlets 42 and one or more soap supplies 41.

The hand dryer 50 generally includes a blower motor 51 configured to heat air and force the heated air to an air output 52 through a conduit 53 that extends between the motor 51 and the air output 52. The motor 51 may have a heater element (not shown) to heat the air. The air output 52 is positioned above the basin 11 and is directed downward into the basin 11 in the embodiment of FIGS. 1-9. The basin 11 may be configured to deflect and/or direct the airflow of the hand dryer 50 away from the user, as shown in FIG. 7 and described in greater detail below. In other embodiments, the hand washing station 10 may include multiple hand dryers 50 that may include multiple air outputs 52 and one or more blower motors 51. The hand dryer 50 may further include an actuator 55, which is illustrated schematically in FIGS. 2 and 13 as an automatic electronic actuator that includes a user proximity sensor to sense when a user's hands are in position for drying, so that the motor 51 can be activated. In other embodiments, a different type of actuator 55 may be used, including a mechanical actuator or an electro-mechanical actuator that mechanically or electronically activates the motor 51.

Figure 15:
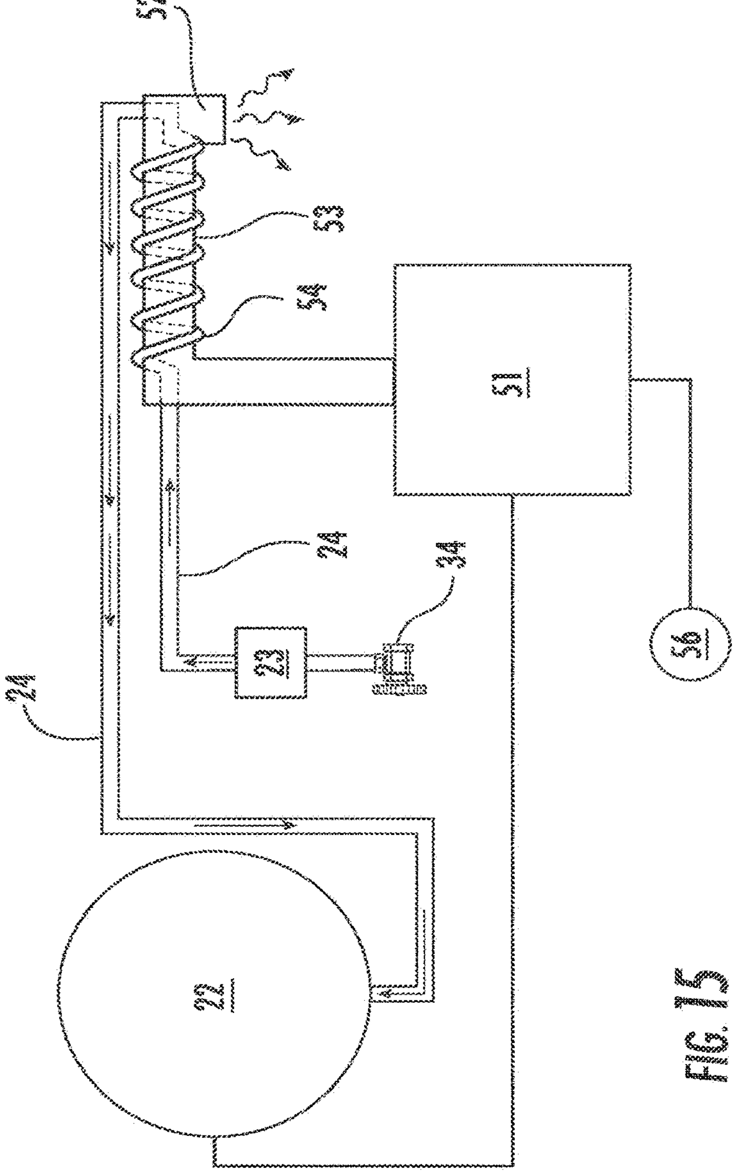
FIG. 15 is a schematic view of another embodiment of the hand washing station of FIG. 1 according to aspects of the disclosure, having a heat exchanger.

In one embodiment, the hand washing station 10 includes a water dispenser 20 and a hand dryer 50 that are integrated so that heat generated by the hand dryer 50 can assist in heating water of the water dispenser 20, as illustrated in FIG. 15. In this embodiment, a portion of the inlet conduit 24 of the water dispenser 20 runs through the air conduit 53 of the hand dryer 50 to form a heat exchanger 54 so that the water in the heat exchanger 54 can absorb heat from the heated air in the air conduit 53, thereby warming the water. The water flowing into the inlet 28 of the water heater 22 is warmed as a result of this configuration, and therefore, the water flowing into the water heater 22 when the valve 23 is opened does not reduce the temperature of the water in the water heater 22 to the same degree as the direct cold water flow that occurs when the inlet conduit 24 extends directly from the water supply 25 to the water heater 22. The configuration shown in FIG. 15 may produce warming of up to 20° F. in the water in the inlet conduit 24. The portion of the inlet conduit 24 forming the heat exchanger 54 is illustrated in FIG. 15 as a coil that runs around the periphery of the air conduit 53, and the coil of the heat exchanger 54 may be made from a highly conductive material such as copper pipe to enhance heat absorption. The heat exchanger 54 and related structures may be configured as described in U.S. Patent Application Publication No. 2014/0261710 A1, which is incorporated by reference herein in its entirety. The heat exchanger 54 in FIG. 15 is positioned downstream from the valve 23 and immediately upstream from the water heater 22, so that the water in the heat exchanger 54 is not under pressure. This reduces the likelihood of water leaks within the hand dryer 50, which may be particularly damaging. In another embodiment, the heat exchanger 54 may be upstream from the valve 23. Additionally, the hand dryer 50 and the water dispenser 20 may be configured to operate so that the water dispenser 20 is not active while the hand dryer 50 is also active, in order to avoid the hand dryer 50 blowing water around.

The frame 60 in the embodiment of FIGS. 1-9 forms a structure that houses and supports all of the components of the hand washing station 10, as well as defining multiple contours and structural features that enhance performance of the station 10. In this embodiment, the frame 60 includes a base or housing 61, a bottom shelf 62 extending outward from the base 61, and a top shelf 63 extending outward from the base 61 and located above the bottom shelf 62, such that a gap or space 64 is defined between the bottom and top shelves 62, 63. The base 61 is positioned adjacent the wall 18 and is mounted to the wall 18 in the embodiment shown in FIGS. 8-9, although the base 61 may be supported in a different manner (e.g., by legs extending to the floor) in another embodiment. The base 61 has an internal cavity 65 that contains and houses components of the water dispenser 20, the soap dispenser 40, and the hand dryer 50, and it is understood that the base 61 may include internal support structures (not shown) for supporting these components, such as shelves, brackets, straps, etc. For example, the base 61 may house at least the water heater 22, the soap supply 41, and the blower motor 51, as well as portions of other components, such as various conduits 24, 26, 53, the heat exchanger 54 (in FIG. 15), various pumps, valves, actuators, and computer components, etc. The internal cavity 65 of the base 61 is open on the rear 15 of the station 10 in the embodiment of FIGS. 1-9, but may be completely enclosed or open in a different configuration in another embodiment, and one or more panels defining the internal cavity 65 may be removable. In other embodiments, one or more of the components may be located external to the frame 60, such as the water heater 22, the soap supply 41, or the blower motor 51. The internal cavity 65 may extend at least partially into one or both of the bottom and top shelves 62, 63 in one embodiment. The configuration of the frame 60 also allows for peripheral support around the base 61 so that suitable access features can be included in the base 61 for case of routine maintenance or replacement of consumables such as a water screen in the valve 23, a HEPA air filter on the hand dryer 50, and the soap in the soap supply 41.

The bottom shelf 62 forms a support for the basin 11 in the embodiment of FIGS. 1-9, and the top surface 67 of the bottom shelf 62 defines the shape and contour of the basin 11. The top shelf 63 forms a support for the water outlet 21, the soap outlet 42, and the air outlet 52 and extends over the basin 11 so that the water outlet 21, the soap outlet 52, and the air outlet 52 are all located directly over the basin 11. In this configuration, the gap 64 between the shelves 62, 63 defines a hand washing area 66 that includes the hand wetting area 31 discussed above, as well as areas for soap dispensing and hand drying. The soap outlet 42, the water outlet 21, and the air outlet 52 are arranged sequentially in one embodiment, so that a user can proceed sequentially from the soap outlet 42 to the water outlet 21 and finally to the air outlet 52 during the hand washing process. These components are arranged sequentially from left to right in the embodiment of FIGS. 1-9. It is understood that the bottom and top shelves 62, 63 may support additional components in other embodiments, such as various actuators, sensors, and cleaning equipment as discussed elsewhere herein.

The basin 11 has a plurality of sloped and contoured surfaces on the top surface 67 of the bottom shelf 62 that define the shape of the basin 11. It is noted that the term “sloped” as used herein does not itself imply that the respective surface is flat or planar, and a sloped surface may have a curved contour unless otherwise specified. The basin 11 generally has a trough 70 that slopes downwardly toward the drain 17, and the trough 70 has two opposed ends 68, 69. In the embodiment of FIGS. 1-9, the trough 70 extends laterally across the basin between left and right ends 68, 69, and the drain 17 is located below the soap outlet 42 near the left end 68 of the trough 70. The trough 70 may slope downward from the right end 69 toward the left end 68, and in the embodiment of FIGS. 1-9, the trough 70 is a planar surface that slopes downward continuously from the right end 69 to the drain 17. The short portion of the trough 70 to the left of the drain 17 in this embodiment may either be relatively flat or sloping from the left end 68 toward the drain 17, with the drain 17 being located at the lowest point on the trough 70 in either configuration. A trough 70 sloped in this manner will ensure that water from the water outlet 21 flows toward and into the drain 17. The trough 70 may also have a slight circumferential recess 71 surrounding the drain 17 to further assist in this action. In other embodiments, the drain 17 may be located elsewhere, and the trough 70 may be sloped downward from one or both ends 68, 69 toward the drain 17, depending on the location and configuration of the drain 17.

Figure 12:
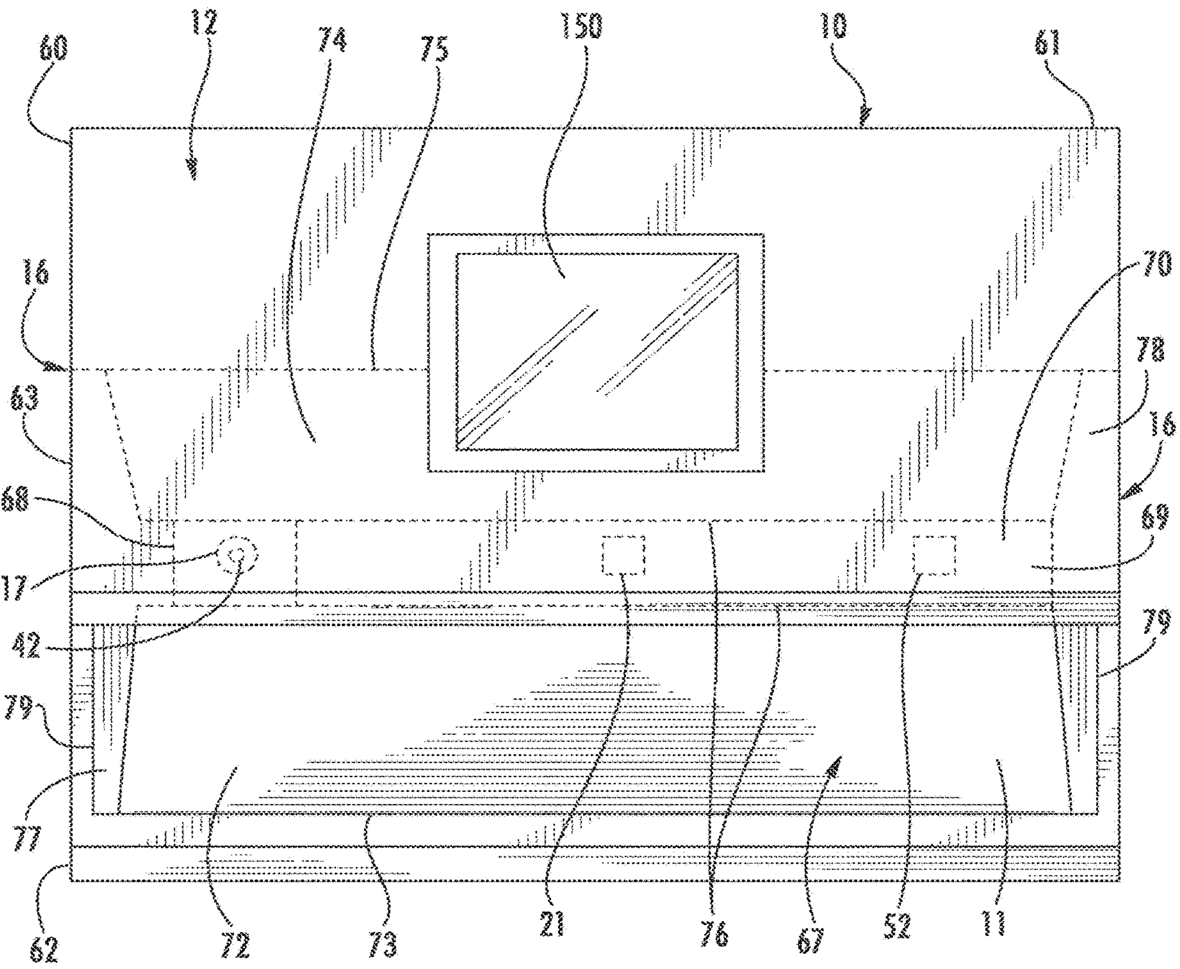
FIG. 12 is another top view of the hand washing station of FIG. 10, with broken lines showing hidden detail.

The basin 11 further includes various sloping surfaces that extend from all ends of the basin 11 toward the trough 70 and/or the drain 17, as shown in FIGS. 1-9 and also in FIG. 12 with respect to a different embodiment with a similarly structured basin 11. A front sloping surface 72 extends from the front end 73 of the basin 11 toward the trough 70 and slopes downward from the front end 73 to the trough 70. A rear sloping surface 74 extends from the rear end 75 of the basin 11 toward the trough 70 and slopes downward from the rear end 75 to the trough 70. In the embodiment of FIGS. 1-9, the front and rear sloping surfaces 72, 74 are flat, planar surfaces that slope downward toward the trough 70 and extend to meet side walls 76 that depend more sharply downward into the trough 70. The side walls 76 may be vertical or substantially vertical in one embodiment, or may have a downward slope in another embodiment, and the side walls 76 in FIGS. 1-9 are planar surfaces. Left and right sloping surfaces 77, 78 extend from the side ends 79 of the basin 11 toward the trough 70 and slope downward from the side ends 79 to the trough 70. The left and right sloping surfaces 77, 78 in the embodiment of FIGS. 1-9 are flat, planar surfaces that slope downward to meet the ends 68, 69 of the trough 70. The left and right sloping surfaces 77, 78 in this embodiment also are located to the left and right of the front and rear sloping surfaces 72, 74, such that the left and right sloping surfaces 77, 78 slope downward to meet the front and rear sloping surfaces 72, 74 as well. In this configuration, any water or other liquids that are in contact with the basin 11 will flow toward and into the trough 70 and then through the trough 70 toward and into the drain 17. As stated above, the nozzles 30 of the water output 21 may be angled slightly toward the drain 17 to assist this flow in one embodiment. In another embodiment, the front and rear sloping surfaces 72, 74 may extend to the trough 70 similarly to the left and right sloping surfaces 77, 78, and/or the trough 70 may have additional side walls extending upward to meet the left and right sloping surfaces 77, 78.

The surfaces of the basin 11 and other features of the frame 60 may also direct the flow of air leaving the air output 52 so that the air flows out of the hand washing station 10 away from the user, as illustrated in FIG. 7. Generally, the air exiting the dryer 50 will create a high pressure zone in the basin 11 and the air will flow toward low pressure zones, and the structure of the frame 60 assists in creating minimal pressure zone changes at the front 14 of the station 10 where the user is present. The frame 60 defines openings 80, 81 between the bottom and top shelves 62, 63 on the sides 16 of the station 10, which are in communication with the gap 64 between the shelves 62, 63. The sloped surfaces of the basin 11 assist in directing some of the air exiting the air outlet 52 toward the sides 16, where the openings 80, 81 allow the air to exit away from the user, as illustrated in FIG.

Figure 9:
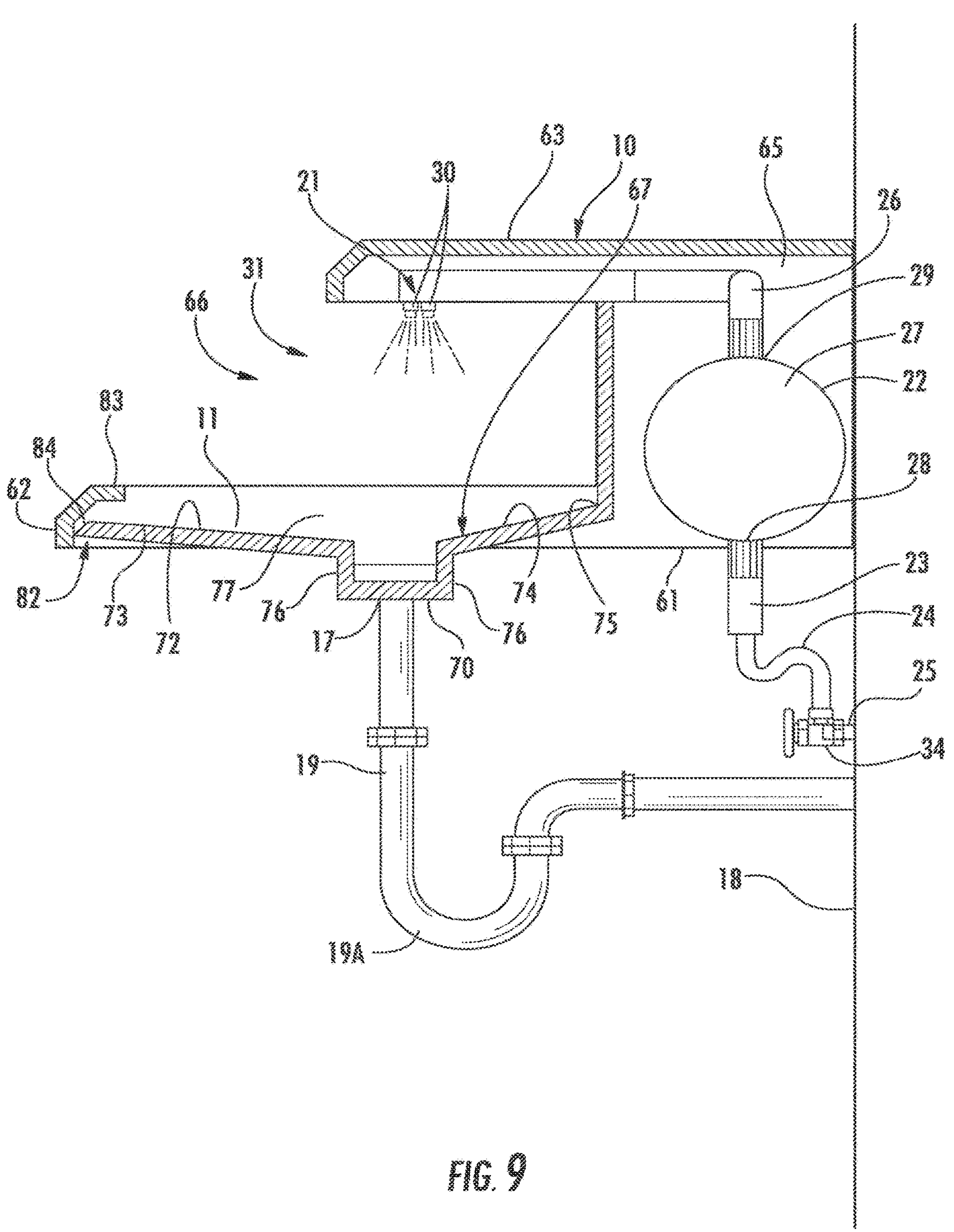
FIG. 9 is a right side cross-sectional view of the hand washing station of FIG. 8.

7. Some space may be required between the sides 16 of the station 10 and any adjacent walls or other surfaces in order to provide low pressure zones for this airflow to exit through the openings 80, 81 as shown in FIG. 7. The air flowing from right to left in FIG. 7 also assists in pushing water and other liquids that may remain in the basin 11 toward the drain 17. The frame 60 further includes one or more vents 82 located at the front 14 of the station 10 that are configured to create a low pressure zone to collect air flowing toward the front 14 along the front sloping surface 72 of the basin 11 and direct or divert the air downward away from the user, as illustrated in FIG. 7. The vent(s) 82 may be configured as described in U.S. Patent Application Publication No. 2015/0074899 A1, which is incorporated by reference herein in its entirety. FIG. 9 shows the configuration of the vent 82 in greater detail. In this embodiment, the frame 60 defines a lip 83 that extends upward and forward from the front 14 of the station 10 and over a portion of the front sloping surface 72, and the vent 82 includes an opening 84 positioned below the lip 83. Air flowing toward the front 14 of the station passes below the lip 83 and is directed downward through the vent 82, exiting downward and away from the user. The vent 82 may run the entire width of the basin 11 in one embodiment, or may run over only a portion of the width of the basin 11 adjacent the air outlet 52 in another embodiment.

The frame 60 may have a compact configuration that has a low height profile in some embodiments. For example, the frame 60 in the embodiment of FIGS. 1-9 has an overall height from the top 12 to the bottom 13 of the station 10 that is approximately 10 inches, not including portions of the trough 70 that may project below the bottom 13 of the station 10. The gap 64 between the bottom and top shelves 62, 63 in this configuration is approximately 6 inches. This configuration provides an aesthetically pleasing appearance and also permits the basin 11 to be an appropriate height, size, and depth for use while also providing sufficient space above the station 10 to accommodate a mirror with a greater reflective area to provide a greater visibility range for the user. Additionally, the front end of the top shelf 63 is located rearward from the front end of the bottom shelf 62 so that the water outlet 21 and soap outlet 42 are located in the middle of the basin 11, and this rearward offset is also configured to provide a convenient reach distance for hand washing. The station 10 may have a lateral width that is determined by the number of stations (e.g., water, soap, dryer) that are included within the station 10.

Figure 9A:
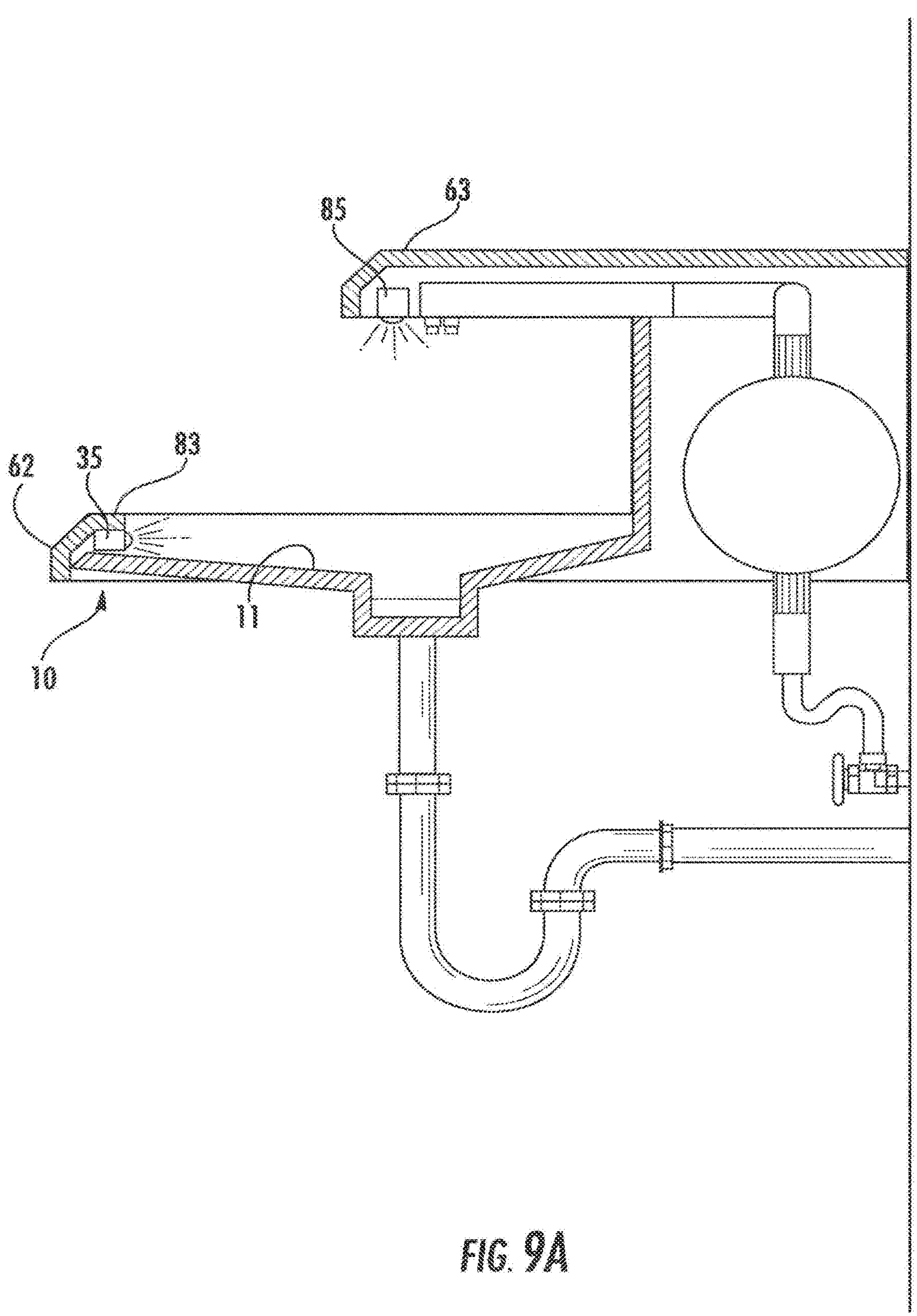
FIG. 9A is a right cross-sectional view of another embodiment of the hand washing station of FIG. 1 according to aspects of the disclosure, having cleaning nozzles and a light installed.

The hand washing station 10 may further include cleaning nozzles 35 or other fluid outlets that are directed into the basin 11 and configured to spray water or another cleaning fluid onto the surfaces of the basin 11 to clean the basin 11. FIG. 9A illustrates one embodiment where one or more cleaning nozzles 35 are connected at the front end 73 of the basin 11 beneath the lip 83 and are directed to spray rearwardly onto the surfaces of the basin 11 to assist in cleaning. Industrial nozzles 35 with accurate spray directions may be used in one embodiment, to ensure that fluid spray is directed to the desired surfaces. The nozzles 35 in FIG. 9A are connected to the water heater 22 or the water supply 25 to spray water, but a separate reservoir of a different cleaning fluid may be used in another embodiment. It is understood that the conduits leading to the nozzles 35 may include one or more valves to provide the ability to activate and deactivate the nozzles 35. The nozzles 35 may be activated in different ways. For example, the station 10 may include an electronic, mechanical, or electro-mechanical actuator to activate the nozzles 35, which can be activated by a user. In another example, the computer system 101 of the station 10 may activate the nozzles 35 automatically, such as at a specific time of day or in a time period determined to be a "sleep" or low-usage period, or at a time during which the computer system 101 determines that the station 10 is being cleaned. In a further example, the computer system 101 may receive a remotely-generated signal to activate the nozzles 35. Various different nozzles 35 or other water outlets in various different positions may be used in other embodiments.

The station 10 may also include various lights 85 for aesthetic or functional uses in various embodiments, as shown schematically in FIG. 9A. In one embodiment, the station 10 includes one or more lights 85 that include at least one ultraviolet (UV) light, such as a UV-FAR light directed into the basin 11, that can be activated to assist in sterilizing the basin 11. The UV light in this embodiment may be activated for extended periods of time or may be activated selectively by the computer system 101 as described above with respect to the nozzles 35. Lights 85 may also direct the user to use the proper sequence of the soap dispenser 40, the water dispenser 20, and the hand dryer 50. It is understood that the station 10 may include different types of lights 85 for different purposes and in different locations.

Installation of the station 10 is simplified in comparison to installation of many existing hand washing devices. For example, only a cold water supply 25 is used in the embodiment of FIGS. 1-9, which simplifies installation relative to a sink that requires both hot and cold water supplies, as well as a mixing valve or other mechanism for mixing the hot and cold water. As another example, the side openings 80, 81 and the desired spaces adjacent the side openings 80, 81 vastly increase the lateral width tolerances for spaces that can accept or receive the station 10. This simplifies installation by not requiring installers to cut or build walls at an exact width to accommodate the station. As a further example, the station 10 may be configured to operate on a single outlet providing, e.g., 120V/20 A/2000 W while powering the entire station 10. FIG. 15 schematically illustrates a potential configuration of this embodiment. In this configuration, the motor 51 of the hand dryer 50 may be connected directly to the outlet 56 and other components (e.g., the water heater 22) may be connected to the motor 51 in a subservient relationship, such that the other components can draw power only if the motor 51 is not in operation. The computer system 100 may include logic to assist this operation as well. This greatly simplifies installation, because only a single standard outlet is needed, and no additional electrical lines need to be installed in any restroom that includes a single outlet in an appropriate location. This configuration also provides further improved energy conservation.

Figure 14:
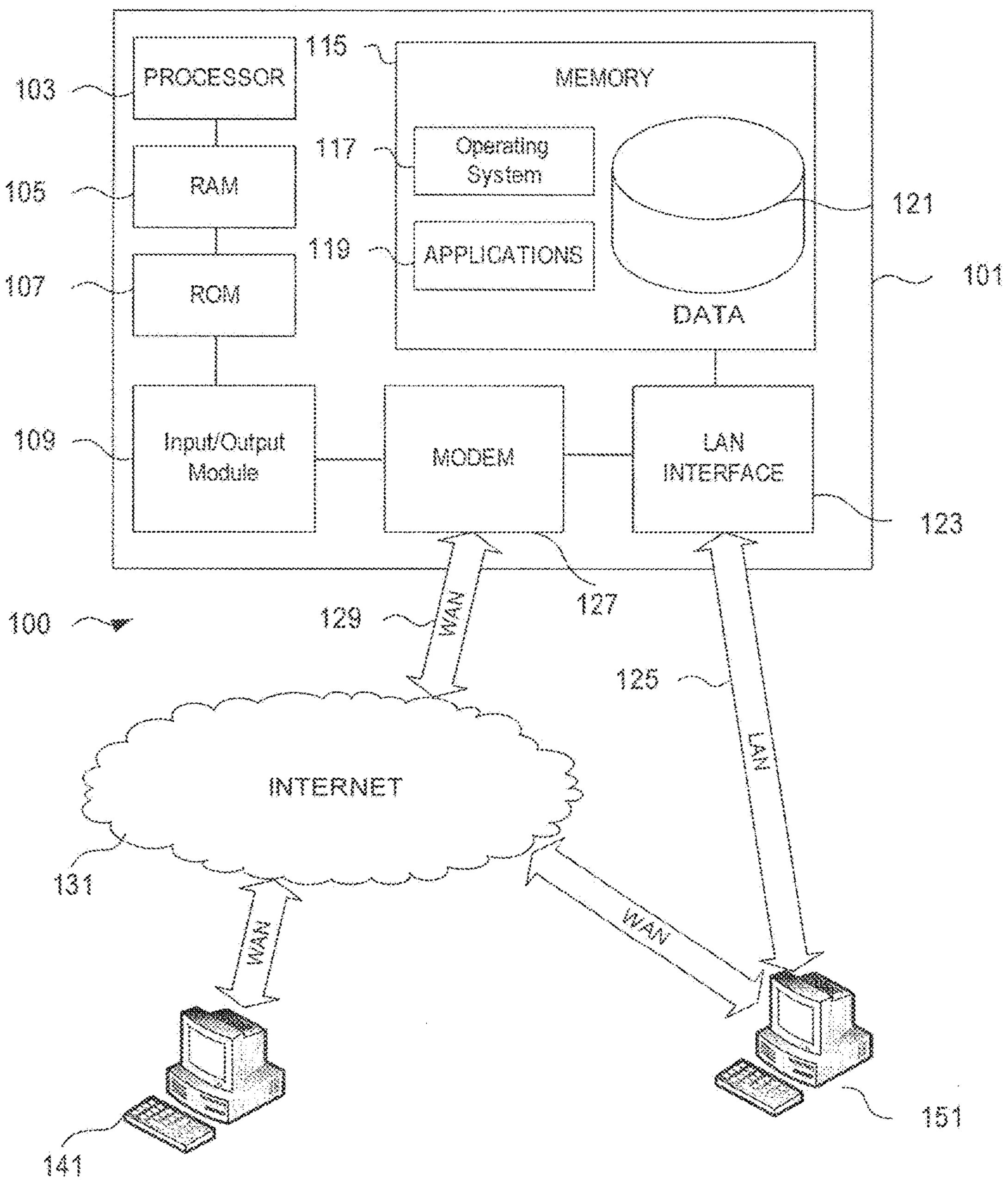
FIG. 14 is a schematic view of the computer system of FIG. 13 showing greater component detail.

The hand washing station 10 may include a computer system 100 that can control and/or monitor one or more components of the station 10, as well as direct any outside communication links for operational efficiency, unit diagnostics, and routine maintenance "soft" alarms. Accordingly, with reference to FIG. 14, the computer system 100 may be embodied as a specific-purpose or specialized computer system 100. Furthermore, those of ordinary skill in the art will appreciate that the computer system 100 may include one or more connected computer devices, such as devices 101, 141, and/or 151. In one example implementation, computing device 101 may have a processor 103 for controlling the overall operation of the device 101 and its associated components, including RAM 105, ROM 107, an input/output (I/O) module 109, and memory 115. In one example, as will be apparent to those of ordinary skill in the art, memory 115 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 115 may comprise a non-transitory computer-readable medium that may communicate instructions to processor 103 to be executed.

I/O module 109 may include a microphone, keypad, touch screen, and/or stylus through which a user of the computing device 101 may provide input, and may also include one or more of a speaker for providing audio output and/or a video display device for providing textual, audiovisual and/or graphical output. Software may be stored within memory 115 and/or storage to provide instructions to the processor 103 for allowing the computing device 101 to perform various functions. For example, memory 115 may store software used by the computing device 101, such as an operating system 117, application programs 119, and an associated database 121. The processor 103, and its associated components, may allow the computing device 101 to run a series of computer-readable instructions to process and format data.

The computing device 101 may operate in a networked environment supporting connections to one or more remote computers, such as external computing devices 141 and 151. The network connections depicted in FIG. 1 include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the computing device 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed. Accordingly, communication between one or more of computing devices 101, 141, and/or 151 may be wired or wireless, and may utilize Wi-Fi, a cellular network, Bluetooth, infrared communication, or an Ethernet cable, among many others. The computing device 101 may also interface and communicate with other devices according to restroom communication configurations set forth in U.S. Pat. No. 7,304,569, which is incorporated by reference herein in its entirety.

Additionally, an application program 119 used by the computing device 101 according to an illustrative embodiment of the disclosure, may include computer-executable instructions for invoking functionality related to management of design, manufacture, and service processes associated with an engineering product, and specifically, for communication of one or more rules associated with the design and/or manufacture of a sub-component of the engineered product between one or more sub-systems of a change management system.

The computing device 101 and/or the other devices 141 or 151 may be personal computers, servers, mobile devices, such as smart phones, personal digital assistants (PDAs), smart watches, and the like, which may include various other components, such as a battery, speaker, and antennas (not shown), or a more simple computer device. The disclosure is operational with numerous other general purpose or special purpose computing system environments or configurations.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 10:
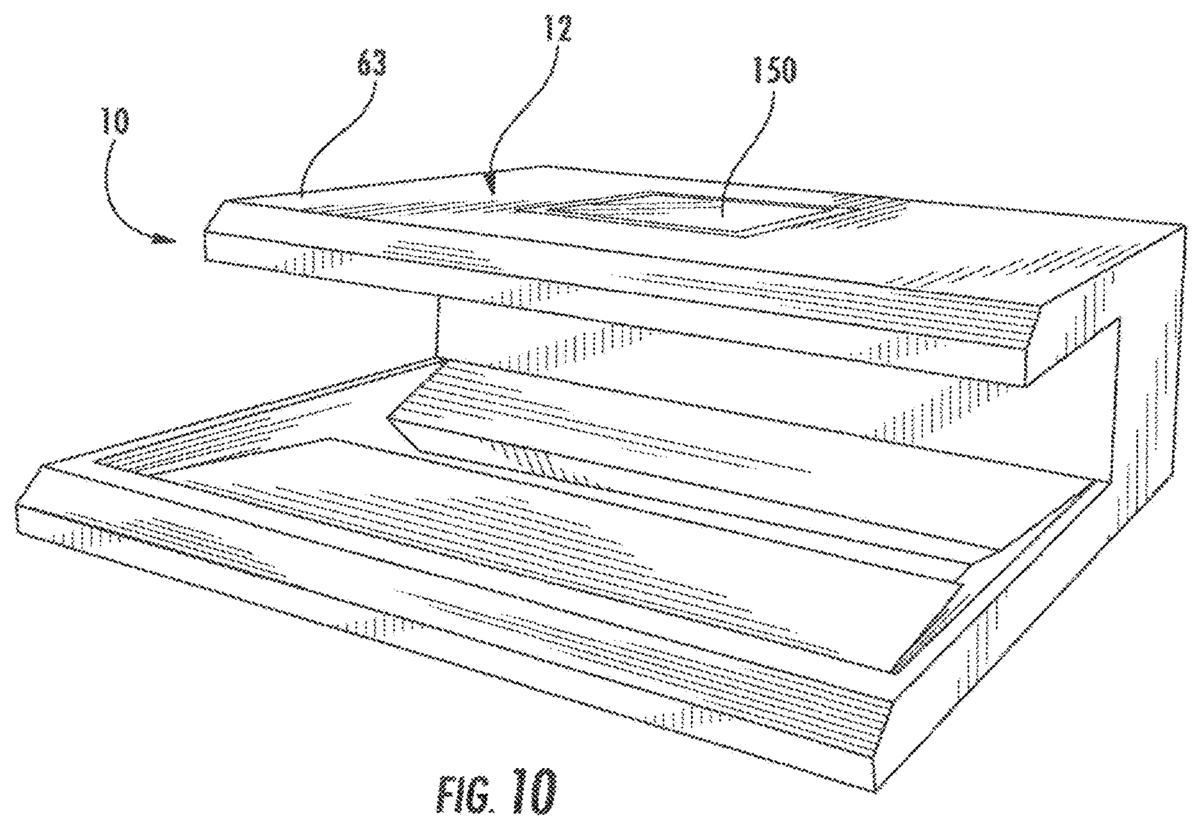
FIG. 10 is a top perspective view of another embodiment of the hand washing station of FIG. 1 according to aspects of the disclosure, having a computer device on a top thereof.
Figure 11:
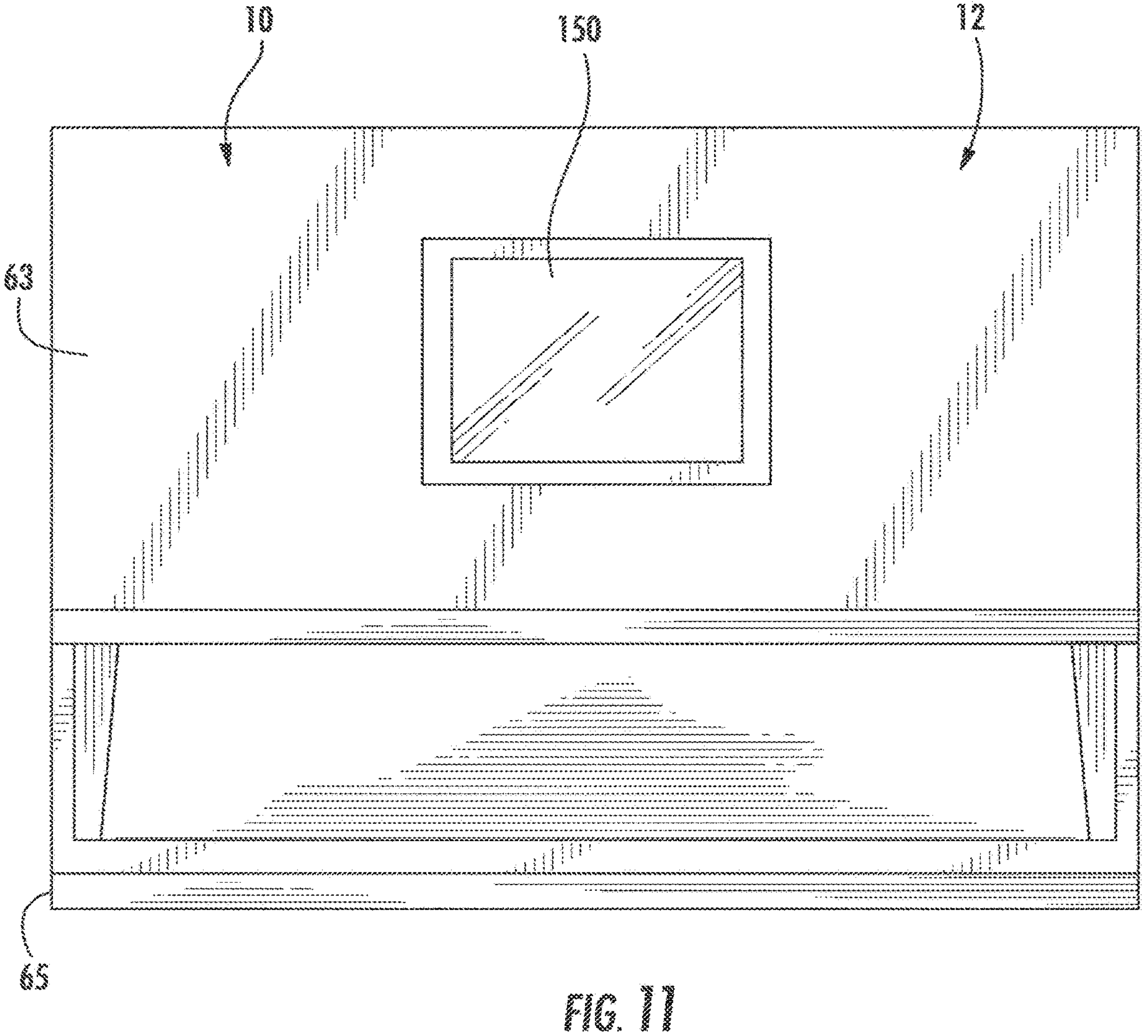
FIG. 11 is a top view of the hand washing station of FIG. 10.

In one embodiment, the station 10 may have an external computing device 150 mounted on the station 10, such as on the top 12 of the station 10 as illustrated in FIGS. 10-12. The external computing device 150 in this example is shown in the form of a tablet computer and may be connected to the computing device 101 by a wired or wireless connection. This external computing device 150 may be used for various purposes, such as providing video to the user for instructional and/or entertainment purposes, receiving user input, transmitting and/or receiving data from a remote external computer, etc. For example, the external device 150 may be programmed to provide instructions on use of the station 10. Further, the external device 150 may be configured to provide a number of viewing angles for different users. For example, the external device 150 may be mounted to extend above the top surface and face forward for wide-angle viewing, and may also be pivotable for this purpose. As another example, the external device 150 may use reverse optic screen display to cause a legible image to appear in a mirror located above the device 150 (e.g., a heads-up display), which can expand utility of the external device 150 to users of various different heights, as well as wheelchair-bound users.

Figure 13:
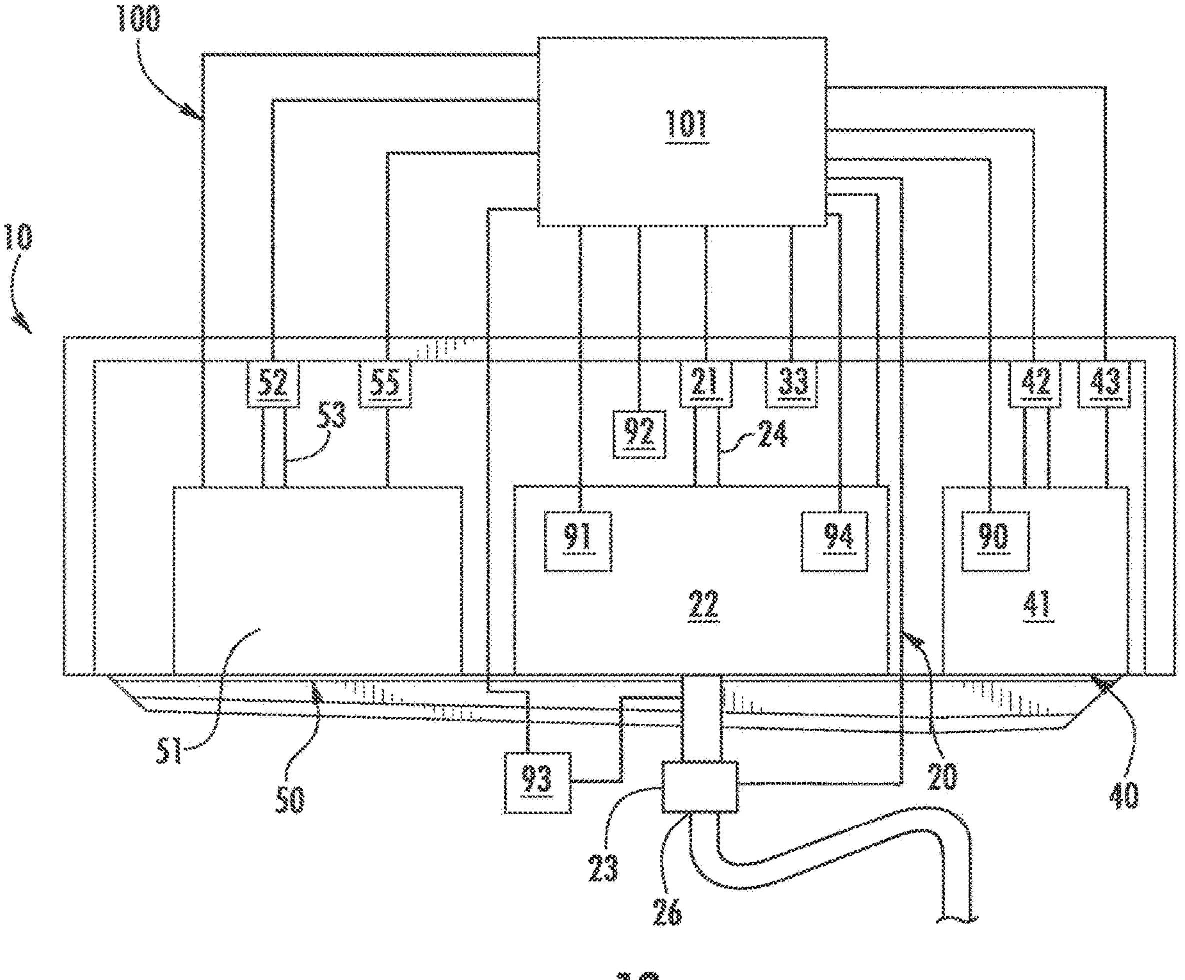
FIG. 13 is a rear schematic view of the hand washing station of FIG. 1 and one embodiment of a computer system associated with the hand washing station according to aspects of the disclosure.

The computer system 100 may have a computing device 101 connected to one or more components of the station 10 for controlling said component(s) and/or one or more sensors for monitoring one or more components or other parameters of the station 10. FIG. 13 schematically illustrates examples of these connections. FIG. 13 illustrates that the computing device 101 is connected to the water heater 22 and the valve 23 of the water dispenser 20, and the blower motor 51 of the hand dryer 50, and the computing device 101 is configured for controlling these components through such connections. FIG. 13 also illustrates that the computing device 101 is connected to the actuator 33 of the water dispenser 20, the actuator 43 of the soap dispenser 40, and the actuator 55 of the hand dryer 50 and is configured to receive input from these actuators 33, such as through proximity sensors contained in each actuator. FIG. 13 further illustrates that the computing device 101 is connected to various sensors and is configured to receive input from the sensors to monitor various components, including a soap supply sensor 90 that can detect and/or monitor the level of soap in the soap supply 41, a thermal sensor 91 connected to the water heater 22 to monitor the temperature of the water in the water heater 22, a thermal sensor 92 connected to the outlet conduit 26, a thermal sensor 93 connected to the inlet conduit 24, and a conductivity sensor 94 connected to the water heater 22. Additional sensors and/or components may be connected to the computing device 101 in various embodiments, such as the nozzles 35 or lights 85 and control/monitoring equipment associated therewith, as well as additional sensors and/or components that are external to the station 10, such as a room occupancy sensor (e.g., a motion detector or scent sensor), a user proximity sensor directed outward from the front 14 of the station, a building control or monitoring system, or various other external computing devices.

The computer system 100 may further be configured to communicate with the computer system 100 of one or more other hand washing stations 10 and/or multiple stations 10 may operate from a single integrated computer system 100. Such communication can enable a restroom with multiple stations 10 to "guide" a user toward one particular station 10 that is more suitable for use, such as by using lights 85 and/or notifications provided by the external device 150. For example, the stations 10 may guide the user toward a station 10 that has a higher consumable level (e.g., soap supply 41) or away from stations that have lower or depleted consumable levels. As another example, a user may be guided toward a station 10 that requires lower energy expenditure to provide water at the correct temperature, i.e., because the water in the water heater 22 is at a higher temperature. This enhances the effectiveness of a sleep mode by enabling other stations 10 to remain in sleep mode while a single station 10 is "ready" for use, lowering overall energy expenditures. This feature may be used to even greater effect in conjunction with a room occupancy sensor as described above, so that one station 10 can be brought out of sleep mode when a user presence is sensed, and the user can then be guided toward that station 10.

The configuration illustrated in FIG. 13 provides the computing device 101 with the ability to control and/or monitor multiple components of the station 10. For example, the computing device 101 can monitor the temperature of the water heater 22 through the thermal sensor 91 and control the water heater 22 by transmitting a signal to activate the heating element when necessary to maintain the desired temperature. As another example, the computing device 101 can detect that a user wishes to activate the soap dispenser 40, the water dispenser 20, and/or the hand dryer 50 by communication with the actuators 33, 43, 55 and can then transmit signals to activate the desired component(s).

The computing device 101 may be further configured to execute more complicated algorithms in the course of controlling and/or monitoring the various components of the hand washing station 10. For example, the computing device 101 may monitor activation or usage of the various components and take actions to generate a report on usage of the station 10, such as by collecting and processing data and/or sending data to an external device for processing. Such a report may include water usage, energy usage, soap usage, number of uses, conservation data (i.e., water, energy, paper, money, or labor saved through use of the station 10), soap inventory, service history, warranty information, etc. This function may further include ordering additional soap inventory if the inventory is below a threshold, ordering service if any component needs servicing or if warranty-based servicing is required, etc. It is understood that some of these functions may require communication with an external computing device and potentially downloading of data from such external device. For example, the computing device 101 can integrate with other control devices within the building and use data from such other devices to improve the utility and functionality of the station 10.

As another example, the computing device 101 may monitor usage of the station 10 and determine periods of high and low usage and to "learn" the environment, in order to place the station 10 in a "sleep" mode of decreased activity and power consumption during periods of expected low usage. Further, the computing device 101 may incorporate data received from a room occupancy sensor, a user proximity sensor, or a sensor that detects when a toilet has been flushed (e.g., a valve sensor) to bring the station 10 out of sleep mode when an occupant of the restroom is detected and/or imminent use of the station 10 is expected.

Figure 22:
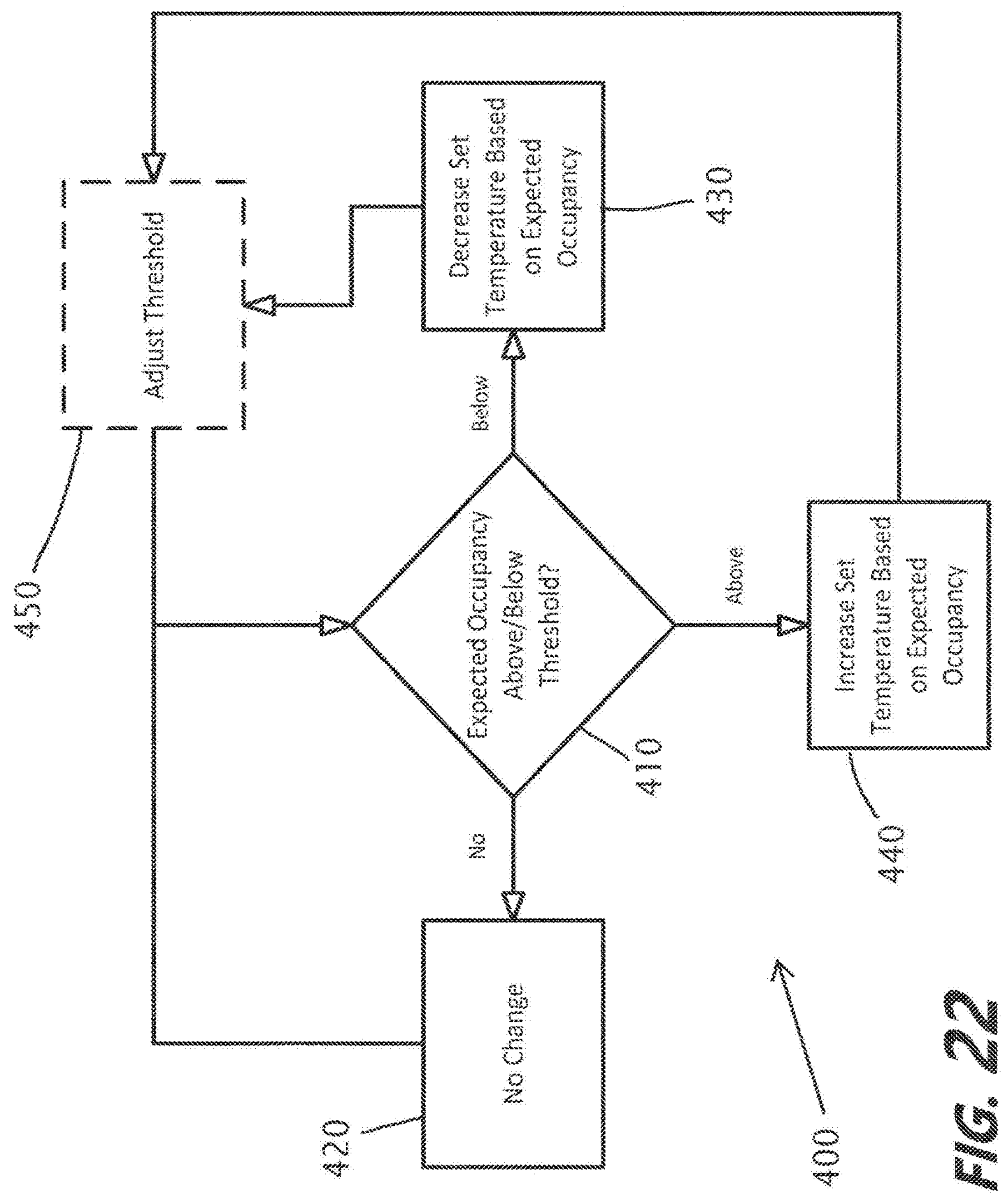
FIG. 22 is a schematic view of another embodiment of a method of operation that is usable in connection with a hand washing station according to aspects of the disclosure.

FIG. 22 illustrates one embodiment of a method 400 for energy conservation by adjusting the set temperature of the water in the water tank 27 based on occupancy data, some or all of the steps of which may be practiced using a computer system 100 as described herein. The method 400 utilizes one or more occupancy thresholds that may be set by a user and/or stored in memory and that are correlated with longer or shorter desired wait times. At step 410, the expected occupancy of the room is determined based on pre-existing occupancy data that is stored in memory and/or received from sensors or another computer device and compared to the current occupancy threshold. The expected occupancy and the occupancy threshold may have various units, e.g., a percentage or proportional chance of occupancy, an occupancy rate per unit time, etc., and the expected occupancy and occupancy threshold may have the same units in any event. If the expected occupancy matches the threshold (which may incorporate a pre-programmed error level), then no change is commenced at step 420. If the expected occupancy is below the threshold, then the set temperature is decreased at step 430, and if the expected occupancy is above the threshold, then the set temperature is increased at step 440. The set temperature may be increased or decreased by a set increment or by an amount based on a calculation incorporating the expected occupancy. Additionally, adjustment of the set temperature may be performed using the method 300 of FIG. 21, such as by increasing or decreasing the desired delay time used at step 320 for periods of low or high expected usage, respectively. The method 400 then returns to step 410, and optionally, the occupancy threshold may be adjusted at step 450 to create a new occupancy status quo that is correlated with the adjusted set temperature.

Figure 23:
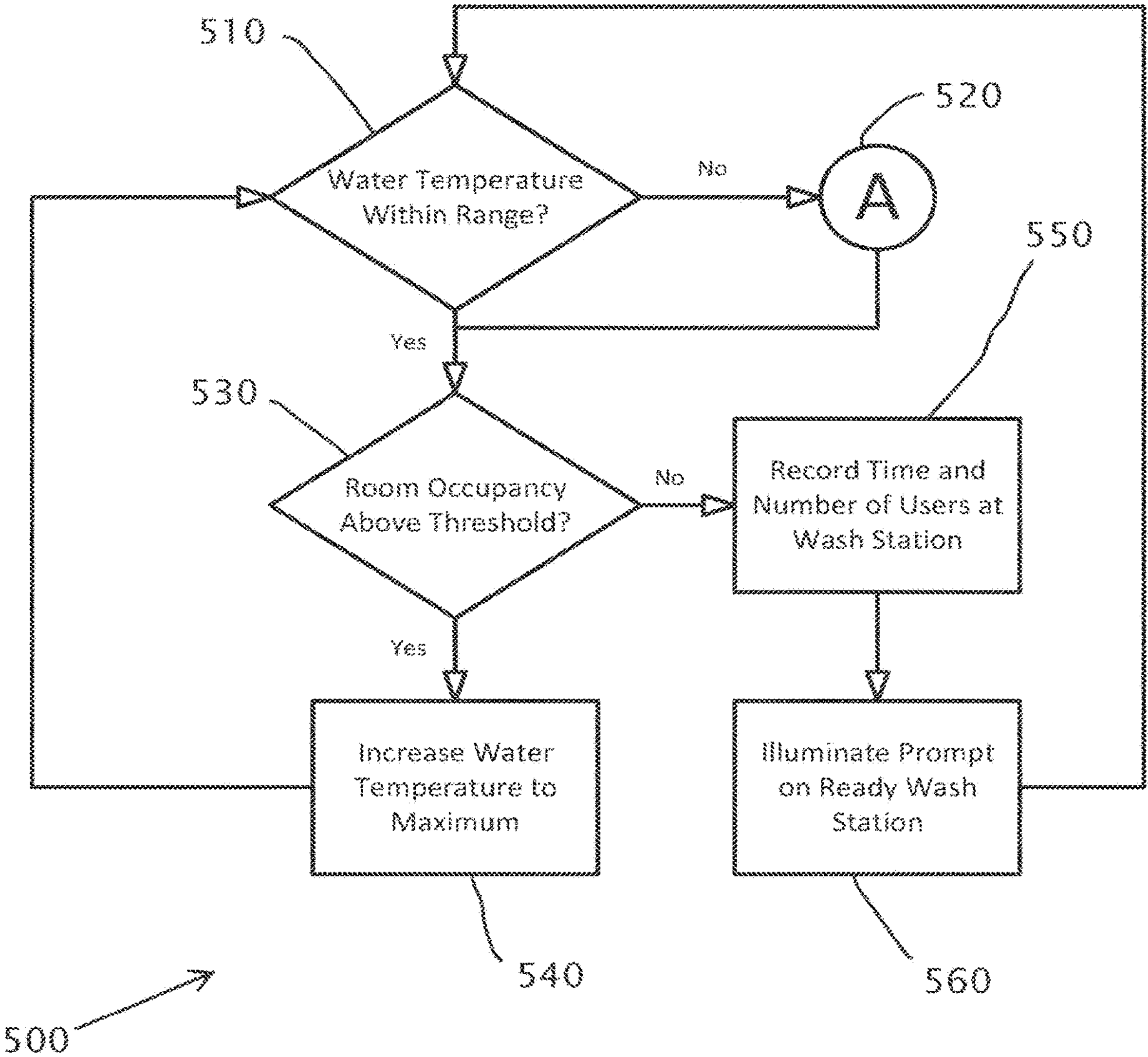
FIGS. 23-24 are a schematic view of another embodiment of a method of operation that is usable in connection with a facility containing one or more hand washing stations according to aspects of the disclosure.
Figure 24:
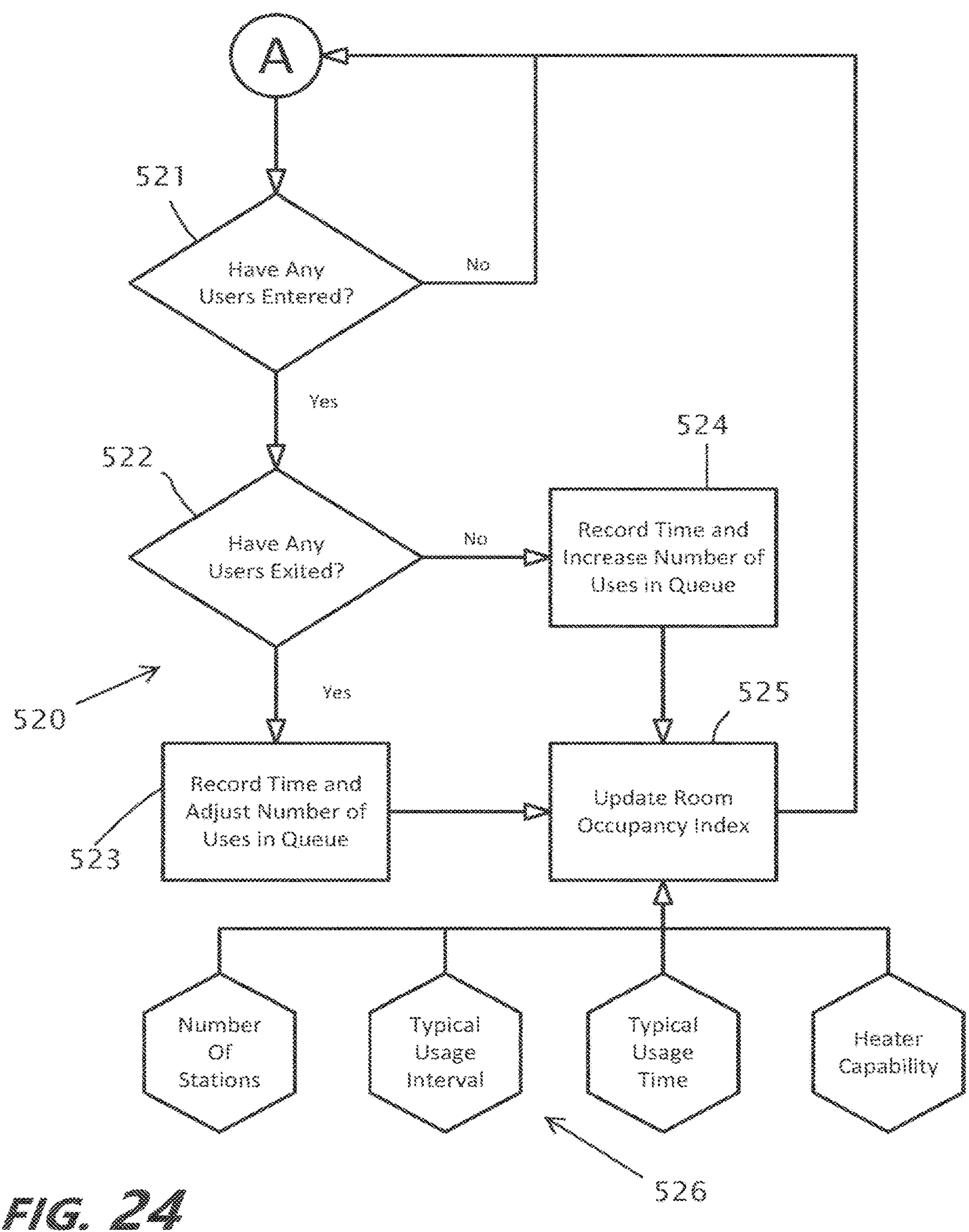

FIGS. 23-24 illustrate a method 500 for operating a facility (e.g., a restroom) that includes a plurality of hand washing stations 10 utilizing room occupancy data, some or all of the steps of which may be practiced using a computer system 100 as described herein. Data from various occupancy sensors described herein may be used in connection with the method 500 of FIGS. 23-24. Beginning in FIG. 23 at step 510, it is determined whether the water temperature of one or more of the stations 10 is at the desired temperature, i.e., within the desired range. The water temperature may be the temperature in the inlet conduit 24, in the water tank 27, or in the outlet conduit 26 (i.e., the dispensing temperature), and may be measured by one or more of the thermal sensors 91, 92, 93 described herein. If the water temperature is not in the desired range, then the station 10 is not "ready" for dispensing water, and the method 500 proceeds to step 520 for updating a room occupancy index that is reflective of the imminent expected workload on the hand washing stations 10 based on occupancy and the maximum workload of the hand washing stations 10 in the facility.

FIG. 24 illustrates the performance of step 520. At step 521, a determination is made of whether any new users have entered the facility, based on data from sensors, e.g., occupancy sensors or other sensors described herein. If no users are detected, then the method proceeds back to FIG. 23. If one or more users are detected, then a determination is made of whether any users were detected exiting the facility at step 522, based on data from sensors as described herein. If one or more users exiting the facility were detected, the number of expected users in the queue is then adjusted based on the number entering and exiting the facility, at step 523. If no users exiting the facility were detected, the number of expected users in the queue is then increased by the number detected entering the facility, at step 524. The room occupancy index is then updated based on the expected users in the queue at step 525, and the method proceeds back to FIG. 23. The room occupancy index may be expressed as a percentage or a proportion of the maximum workload of the facility, and may depend on multiple factors 526, including one or more of: the number of stations 10 in the facility, the typical interval between usage of a station 10, the typical usage time of a station 10, and the capability of the water heaters 10, i.e., the maximum heating rate, which may be determined as described elsewhere herein.

Returning to FIG. 23, the room occupancy index is compared to an occupancy threshold to determine whether the threshold has been exceeded, at step 530. The threshold may be based on user-determined factors, and in one embodiment, the threshold is selected at a point where the expected demand on the facility is such that all stations 10 must be set to their maximum possible output level to ensure that the demand is met, which may be an index level of 75%, 80%, 85%, 90%, or 95% in some embodiments. The facility is configured to operate in at least two different operational modes based on whether the occupancy threshold is exceeded. If the occupancy index is above the threshold in the embodiment of FIG. 23, then in a first operational mode, all of the stations 10 in the facility are set to their maximum possible output level at step 540, i.e., by activating the water heaters 22 to heat the water in each station 10 to the maximum level within the desired range. The method then returns to step 510. If the occupancy index is not above the threshold, then in the embodiment of FIG. 23, the facility operates in a second operational mode, which corresponds to normal operation. This normal operation may be any operational mode described herein, including the modes in FIGS. 20-22. Additionally, occupancy data is gathered at step 550, such as by recording the time and number of users at each wash station 10, and prompts may be activated at any station(s) 10 that are "ready for use," i.e., for which the temperature is within the desired range or can be heated to the desired range within the desired delay time, at step 560. Such prompts may be configured to lead users to "ready" stations for maximum efficiency. Such prompts may be generated by activation of by lights 85 and/or the external device 150 in one embodiment, but may take the form of other visual and/or audio prompts in other embodiments. Step 560 may be practiced in conjunction with operation pursuant to step 540 as well. The method then returns to step 510.

Figure 17:
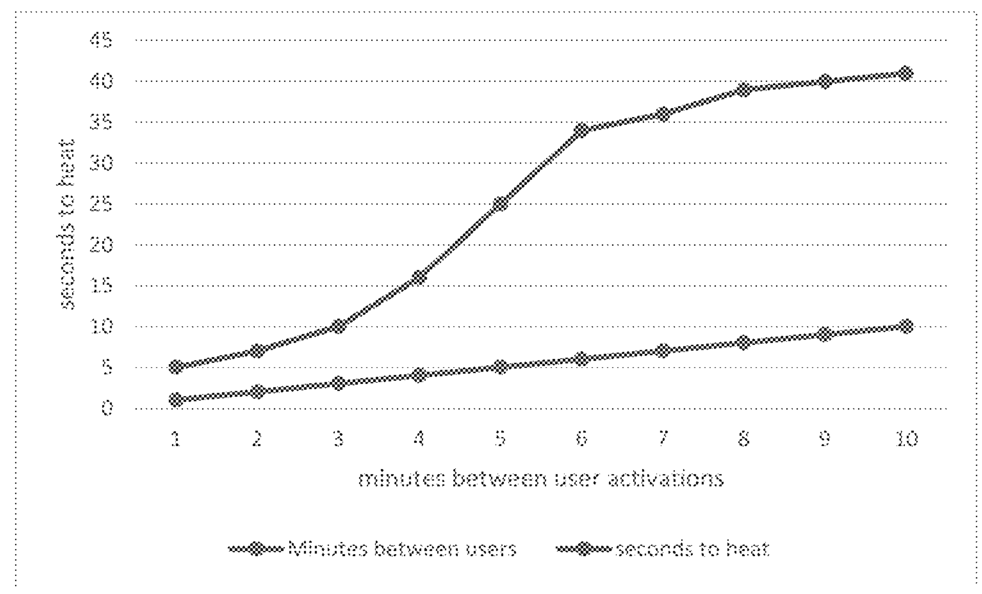
FIG. 17 is a graph illustrating the relative relationship between frequency of user activations and the time for the conductive water heater to bring the water tank to the desired temperature.
Figure 18:
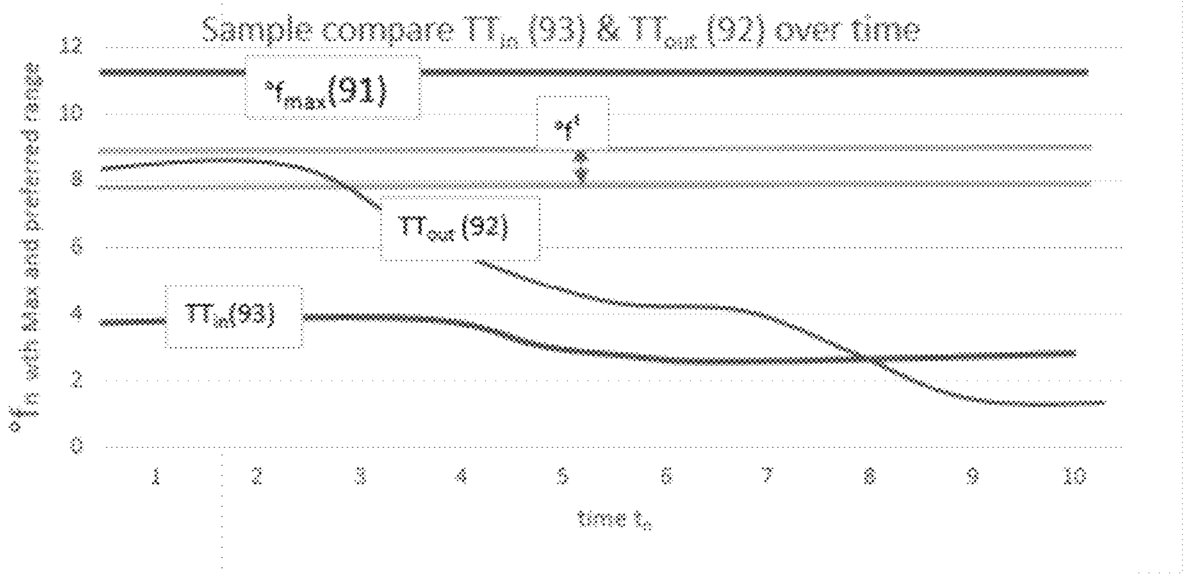
FIG. 18 is a graph illustrating an example comparison of temperatures from various temperature sensors within the hand washing station as illustrated in FIG. 13 over time, where $° f_n$ is the temperature at time $t_n$, ° f' is a desired water temperature range, $° f_{max}$ is the maximum temperature allowed in the system, $TT_{out}$ is the temperature of water at the tank outlet as measured by sensor 92 in FIG. 13, and $TT_{in}$ is the temperature of water at the tank inlet as measured by sensor 93 in FIG. 13.

As another example, the computing device 101 may monitor the temperature and conductivity of the water in the water heater 22, as well as optionally the water temperatures in the inlet conduit 24 and/or the outlet conduit 26, and determine a potential heating configuration to conserve energy. The computing device 101 can determine a temperature to maintain the water in the water heater 22 that is below the desired temperature based on a calculation of how quickly the water can be heated to the desired temperature upon activation of the water dispenser 20. Long term usage and temperature data may also be factored into the calculation. The speed with which the water can be heated will depend on the conductivity of the water as monitored by the computing device 101, such as through a conductivity sensor 94 or a known pre-tested value. The computing device 101 will then control the water heater 22 to maintain the temperature based on a desired response time threshold for dispensing water upon activation of the water dispenser 20, allowing for the time the water heater 22 will take to heat the water to the desired temperature prior to dispensing, as described herein with respect to FIG. 21. The computing device 101 can also resolve whether energy is conserved by this strategy based in part on the frequency of usage of the station 10 and determine whether the strategy should be used based on the energy conservation resolution. Such a determination may be performed by calculating or measuring the energy expended by maintaining the temperature at the desired temperature (i.e., within the desired range) and calculating or measuring the sum of the energy expended by maintaining the temperature at the set temperature plus the energy expended by increasing the temperature to the desired temperature, and then comparing these energy expenditures. The computing device 101 may further incorporate sensor data as discussed above with respect to the sleep mode logic, in order to anticipate imminent use of the station 10 and activate the water heater 22 as appropriate. These actions collectively minimize the time that the water heater 22 is kept at the desired temperature, reducing overall energy consumption. FIG. 17 illustrates one relative example of how the time to heat the water heater to the desired temperature can increase based on increasing time between uses, further illustrating the benefit of the use of this algorithm by the computing device 101. FIG. 18 illustrates an example of the effect of heat dissipation during inactivity of the water heater 22 by comparing the outlet temperature (measured by sensor 92) and the inlet temperature (measured by sensor 93), which tend to converge in the long term during periods of inactivity. The computing device 101 can incorporate data such as that illustrated in FIG. 18 in determining when to input energy into the water heater 22 or when to shut down energy input to the water heater 22 as described above. For example, the computer device 101 may include a lookup table based upon data such as illustrated in FIG. 18 in combination with additional data, such as flow rate and heating data (e.g., in FIGS. 16-17). The water heater 22 can remain inactive as long as the temperature does not fall below a level where the heater can raise the temperature to the desired range (° f' in FIG. 18) within a minimum threshold time, as determined by the computing device 101.

As another example, in one embodiment, the computing device 101 may be configured to execute a cleaning cycle by activating the nozzles 35 and/or the LED light 85 at an appropriate time, such as when the computer device 101 receives input from an actuator or an external computer, detects a period of non-use (e.g., sleep mode), detects that a threshold time period has passed since the last cleaning cycle, or otherwise determines that a cleaning cycle should begin. The computing device 101 may further temporarily raise the temperature of the water heater 22 in order for the nozzles 35 to use higher temperature water for cleaning. The computing device 101 may cause alerts or notifications to be generated, e.g., by lights 85 and/or the external device 150, to prevent a user from using the station 10 while the high-temperature water is being expelled during the cleaning mode. The computing device 101 may additionally or alternately disable normal use of the station 10 during the cleaning mode, such as by deactivating the actuators 33, 43, 55.

A hand washing station according to the aspects described herein provide multiple advantages over existing hand washing equipment. The use of a non-pressurized water heater reduces the risk of failure, increasing safety and decreasing maintenance costs. The use of a water heater in close proximity to the water outlet permits heated water to be delivered almost instantaneously at a desired temperature. The low flow rate of the water outlet compared to the volume of the water heater provides benefits in water conservation and energy conservation. The use of a conductive water heater provides versatility in use, as a conductive water heater can be capable of operating with many different types and levels of power outputs. This allows the heater to be selected based on unit demand (e.g., discharge rate and heating rate) as sole or primary considerations. The use of a conductive water heater also increases safety compared to other water heaters, because no electrical wire is exposed to the water in a conductive water heater, eliminating the danger of such a configuration. The configuration of the water heater also permits the station to operate in lower temperature environments without freezing compared to other types of instantaneous water heaters, which do not have a reservoir maintained at an elevated temperature and are therefore susceptible to freezing. Various features of the station, including the open ends of the frame, the single water connection, and the single outlet connection, greatly simplify installation of the station. The structure of the frame improves cleanliness of the basin and the airflow characteristics of the hand dryer, and further locates the basic elements of good hand washing (water, soap, and hand drying) in alignment for optimal hand washing ergonomics. The various algorithms executed by the computer system can improve efficiency, cleaning, maintenance, usability, and many other aspects of operation of the station. Still further benefits and advantages are recognizable to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "third," etc., if used herein, are intended for illustrative purposes only and do not limit the embodiments in any way. In particular, these terms do not imply any order or position of the components modified by such terms. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. A hand washing station comprising:

a support structure configured for mounting in a place of use;

a water heater comprising a water tank and a heating element configured to heat water contained in the water tank, the water tank having an inlet conduit connected to a water source and an outlet conduit, wherein the water heater is engaged with the support structure;

a plurality of water outlets connected to the outlet conduit and configured to receive the water from the water heater through the outlet conduit, wherein the plurality of water outlets are supported by the support structure; and a plurality of valves in fluid communication with the water heater and connected to the outlet conduit, wherein the plurality of valves are configured and positioned to selectively permit the water to pass from the water tank and through one or more of the plurality of water outlets to dispense the water.

2. The hand washing station of claim 1, further comprising a plurality of actuators, each of the plurality of actuators corresponding to one of the plurality of water outlets, wherein the plurality of actuators are in operably connected to the plurality of valves such that activation of each of the plurality of actuators is configured to actuate one or more of the plurality of valves to permit the water to pass from the water tank through the one of the plurality of water outlets corresponding to the actuator.

3. The hand washing station of claim 2, wherein the plurality of actuators comprise a first actuator corresponding to a first water outlet of the plurality of water outlets, the first water outlet being in fluid communication with the outlet conduit by a first branch conduit having a first valve of the plurality of valves, wherein the first actuator is configured to actuate the plurality of valves to permit the water to pass from the water tank through the first water outlet by opening the first valve.

4. The hand washing station of claim 2, wherein the water heater is configured to heat the water in the water tank to a desired temperature after receiving an activation indication based on actuation of at least one of the plurality of actuators, and wherein the water heater is configured to maintain the water in the water tank at a set temperature below the desired temperature and to heat the water from the set temperature to the desired temperature after receiving the activation indication and before the water is dispensed.

5. The hand washing station of claim 2, wherein the plurality of actuators comprise a first actuator corresponding to a first water outlet of the plurality of water outlets, wherein the first actuator is configured to actuate the plurality of valves to permit the water to pass from the water tank through the first water outlet by closing one or more of the plurality of valves to prevent water flow through other water outlets of the plurality of water outlets.

6. The hand washing station of claim 2, further comprising an inlet valve located on the inlet conduit, wherein the activation of each of the plurality of actuators is configured to open the inlet valve to permit the water to pass from the water tank through the one of the plurality of water outlets corresponding to the actuator.

7. The hand washing station of claim 1, wherein the support structure comprises a lower shelf supporting one or more basins, an upper shelf supporting the plurality of water outlets above the one or more basins, and a base connected to the lower shelf and the upper shelf, wherein the water tank is located within the base.

8. The hand washing station of claim 7, further comprising a soap dispenser and a hand dryer engaged with the support structure.

9. The hand washing station of claim 1, further comprising:

a computer device connected to the water heater, the computer device programmed with computer-executable instructions that, when executed, cause a processor of the computer device to perform:

monitoring a temperature of the water in the water tank;

determining a conductivity of the water in the water tank; and controlling the water heater to maintain the temperature of the water in the water tank based on the conductivity of the water.

10. The hand washing station of claim 1, further comprising:

a computer device connected to the water heater, the computer device programmed with computer-executable instructions that, when executed, cause a processor of the computer device to perform:

monitoring a temperature of the water in the water tank;

calculating a set temperature that is below a desired temperature of the water in the water tank, such that the water can be heated from the set temperature to the desired temperature in a threshold time period; and controlling the water heater to maintain the temperature of the water in the water tank at the set temperature and to heat the temperature of the water to the desired temperature prior to dispensing of the water from one or more of the plurality of water outlets.

11. A hand washing station comprising:

a water heater comprising a water tank and a heating element configured to heat water contained in the water tank, the water tank having an inlet conduit connected to a water source and an outlet conduit;

a plurality of water outlets connected to the outlet conduit and configured to receive the water from the water heater through the outlet conduit;

a plurality of valves in fluid communication with the water heater and connected to the outlet conduit, wherein the plurality of valves are configured and positioned to selectively permit the water to pass from the water tank and through one or more of the plurality of water outlets to dispense the water;

a plurality of actuators, each of the plurality of actuators corresponding to one of the plurality of water outlets, wherein each of the plurality of actuators is configured for receiving user input and for generating an activation indication in response to the user input; and a computer device connected to the plurality of valves, the computer device programmed with computer-executable instructions that, when executed, cause a processor of the computer device to perform:

receiving the activation indication from a first actuator of the plurality of actuators, the first actuator corresponding to a first water outlet of the plurality of water outlets; and actuating one or more of the plurality of valves, in response to receiving the activation indication, to permit the water to pass from the water tank through the first water outlet.

12. The hand washing station of claim 11, wherein the computer device is configured for keeping the plurality of valves closed until the activation indication is received, and opening a first valve of the plurality of valves associated with the first water outlet in response to receiving the activation indication, to permit the water to pass from the water tank through the first water outlet.

13. The hand washing station of claim 11, wherein the computer device is configured for keeping the plurality of valves open until the activation indication is received, and, in response to receiving the activation indication, leaving open a first valve of the plurality of valves associated with the first water outlet, to permit the water from the water tank to pass through the first water outlet, and closing at least some of the plurality of valves other than the first valve as necessary to avoid the water from being forced through other water outlets of the plurality of water outlets.

14. A hand washing station comprising:

a water heater comprising a water tank and a heating element configured to heat water contained in the water tank, the water tank having an inlet conduit connected to a water source and an outlet conduit;

a water outlet connected to the outlet conduit and configured to receive the water from the water heater through the outlet conduit;

a valve in fluid communication with the water heater and configured to selectively permit the water to pass from the water tank and through the water outlet to dispense the water; and a hand dryer configured for blowing heated air through a dryer output, the hand dryer having a heat exchanger engaged with a portion of the hand dryer and the inlet conduit, wherein the heat exchanger is configured to absorb heat from the hand dryer and to deliver the heat to the inlet conduit to heat water in the inlet conduit.

15. The hand washing station of claim 14, further comprising a support structure having a lower shelf supporting a basin, an upper shelf supporting the water outlet and the hand dryer output above the basin, and a base connected to the upper shelf and the lower shelf, wherein the heat exchanger and the portion of the hand dryer are at least partially contained within the base.

16. The hand washing station of claim 15, wherein the water heater and the hand dryer are at least partially contained within the base.

17. The hand washing station of claim 14, wherein the hand dryer further comprises a blower motor and an air conduit extending from the blower motor to the dryer output and configured to transport the heated air from the blower motor to the dryer output, and wherein the heat exchanger is engaged with the air conduit to absorb the heat from the heated air in the air conduit.

18. The hand washing station of claim 17, wherein a portion of the inlet conduit runs through the air conduit to form the heat exchanger, wherein the heat exchanger is configured such that the water in the inlet conduit passes through the portion of the inlet conduit to absorb the heat from the heated air in the air conduit.

19. The hand washing station of claim 17, wherein the heat exchanger comprises a coil that runs around a periphery of the air conduit, wherein the heat exchanger is configured such that the water in the inlet conduit passes through the coil to absorb the heat from the heated air in the air conduit.

20. The hand washing station of claim 14, wherein the heat exchanger is positioned downstream from the valve and upstream from the water heater.

* * * * *